United States Patent Office 3,557,142
Patented Jan. 19, 1971

3,557,142
4,5,6,7-TETRAHYDRO-INDOLE-LOWER-ALKANOIC ACIDS AND ESTERS
Malcolm R. Bell, East Greenbush, N.Y., assignor to Sterling Drug Inc., New York, N.Y., a corporation of Delaware
No Drawing. Filed Feb. 20, 1968, Ser. No. 706,802
Int. Cl. C07d 27/54
U.S. Cl. 260—326.13
1 Claim

ABSTRACT OF THE DISCLOSURE

New 3-substituted-1 - indole- and 4,5,6,7 - tetrahydro-indole-lower-alkanoic acids and esters having useful anti-inflammatory activity and prepared by alkylation of a 3 - substituted - indole with an appropriate halo-lower-alkanoic acid or ester or by cyclization of a 2-(2-$R_2$-2-oxo-ethyl)cyclohexanone or 2-(1 - phenyl-2-oxo-lower-alkyl) cyclohexanone with an amino acid or ester.

This invention relates to certain 3-substituted-1-indole-lower alkanoic acids and esters having the formula:

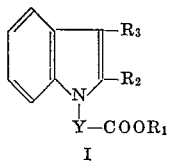

I where $R_1$ is hydrogen or lower-alkyl; $R_2$ is hydrogen, lower-alkyl, carboxy, carbo-lower-alkoxy, or hydroxymethyl; $R_3$ is phenyl, phenyl - lower-alkanoyl, benzoyl, thiophenecarbonyl, furancarbonyl, pyridinecarbonyl, isoxazolecarbonyl, thiazolecarbonyl, isothiazolecarbonyl, phenyl-lower-alkyl, 3-phenyl-3-oxo-1-propenyl, or phenyl-lower-alkenoyl; and Y is lower-alkylene.

The invention also embraces the 4,5,6,7 - tetrahydro derivatives of the compounds of the Formula I, and the former are represented by the Formula Ia:

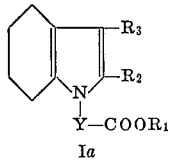

Ia

The compounds of Formulas I and Ia are useful as anti-inflammatory agents as more fully discussed hereinafter.

As used herein, the term "lower-alkyl" means saturated, monovalent aliphatic radicals, including straight or branched-chain radicals of from one to six carbon atoms, as illustrated by, but not limited to, methyl, ethyl, propyl, isopropyl, n-butyl, t-butyl, amyl, hexyl, and the like.

As used herein the term "lower-alkylene" means divalent, saturated, aliphatic radicals, including straight or branched-chain radicals of from one to six carbon atoms, as illustrated by, but not limited to, methylene, 1,1-ethylene, 1,2-ethylene, 1,3-propylene, 1,2-propylene, 1,6-hexylene, and the like.

As used herein the term "phenyl-lower-alkanoyl" means a monovalent radical derived from a phenyl-lower-alkanoic acid by removal of the hydroxyl group from the carboxylic moiety thereof. The term thus includes straight or branched-chain lower-alkanoyl radicals containing from one to six carbon atoms in the lower-alkanyl moiety. The term "phenyl-lower-alkanoyl" therefore includes, inter alia, phenylacetyl, β - phenylpropionyl, α-phenylpropionyl, γ-phenylbutyryl, and the like.

As used herein the term "phenyl-lower-alkenoyl" means a monovalent radical derived from a phenyl-lower-alkenoic acid by removal of the hydroxyl group from the carboxylic moiety thereof. The term "phenyl-lower-alkenoyl" includes straight or branched-chain lower-alkenoyl radicals containing from three to six carbon atoms in the lower-alkenoyl moiety, and thus includes, inter alia, cinnamoyl, α-methlycinnamoyl, β-ethylcinnamoyl, and the like.

The compounds of Formula I are prepared by reaction of an appropriate 3-substituted-indole with a halo-lower-alkanoic acid or lower-alkyl ester thereof in the presence of an acid-interceptor which serves to take up the hydrogen halide split out during the course of the reaction. The reaction is represented by the equation:

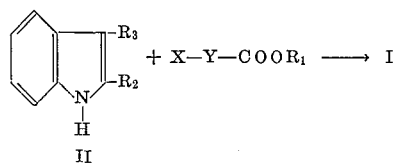

where $R_1$, $R_2$, $R_3$, and Y have the meanings given above, and X represents halogen. The reaction is carried out at a temperature from 20° C. to about 150° C. in an organic solvent inert under the conditions of the reaction, for example benzene, toluene, xylene, dimethylformamide, and the like. A preferred solvent is dimethylformamide, and a preferred acid-acceptor is sodium hydride.

The compounds of Formula I where $R_1$ is hydrogen can also be prepared by saponification of the corresponding esters where $R_1$ is lower-alkyl by heating a solution of the latter in a lower-alkanol, for example, methanol, ethanol, isopropanol, and the like, and containing a molar excess of an alkali metal hydroxide, for example sodium or potassium hydroxide.

The compounds of Formula I where $R_2$ is hydroxymethyl are prepared by reducing the corresponding indole-2-carboxylic acids or esters ($R_2$ is carboxy or carbo-lower-alkoxy) of Formula II with lithium aluminum hydride thus affording the corresponding compounds of Formula II where $R_2$ is hydroxymethyl which are then reacted with a halo-lower-alkanoic acid or lower-alkyl ester thereof, as described above, to give the compounds of Formula I. The reduction with lithium aluminum hydride is carried out at a temperature from 10° C. to about 70° C. in an organic solvent inert under the conditions of the reaction, for example diethyl ether or tetrahydrofuran. A preferred solvent is tetrahydrofuran.

The intermediate 3-substituted-indoles of Formula II where $R_3$ is phenyl are prepared by Fischer indole cyclization of an $R_3$-benzyl ketone (or aldehyde) phenyl hydrazone accordng to the reaction:

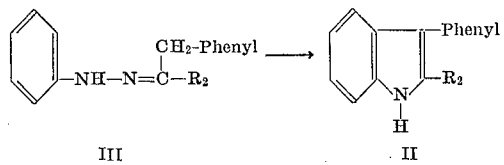

where $R_2$ has the meanings given above. The reaction is carried out by heating the hydrazone III in the presence of an acid, for example hydrochloric acid, sulfuric acid, p-toluenesulfonic acid, glacial acetic acid, and the like, in an organic solvent inert under the conditions of the reaction, for example methanol, ethanol, isopropanol, benzene, toluene, and the like. When glacial acetic acid is used as the acid condensing agent, it can be used as the solvent medium as weil.

The hydrazones of Formula III in turn are prepared by reacting a phenylhydrazine of Formula IV with an appropriate $R_2$-benzyl ketone (or aldehyde) of Formula V. The reaction is represented by the equation:

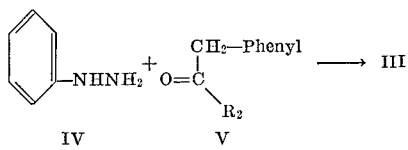

and generally takes place at room temperature. Like the cyclization of the hydrazones of Formula III to the indoles of Formula II, the reaction is advantageously carried out in an organic solvent inert under the conditions of the reaction, for example methanol, ethanol, isopropanol, and the like, and in the presence of an acid, for example hydrochloric acid, sulfuric acid, p-toluenesulfonic acid, glacial acetic acid, and the like.

The hydrazones of Formula III thus formed can, if desired, be isolated from the reaction mixture before cyclizing to the indoles of Formula II, but it is preferred to carry the reaction to completion, without isolating the intermediate hydrazones, by heating the reaction mixture containing the hydrazone which itself is formed at lower temperatures.

The intermediate 3-substituted-indoles of Formula II where $R_3$ is benzoyl, thiophenecarbonyl, furancarbonyl, pyridinecarbonyl, isoxazolecarbonyl, thiazolecarbonyl, isothiazolecarbonyl, phenyl-lower-alkanoyl, or phenyl-lower-alkenoyl are prepared by reacting the acid halide corresponding to the acids defined by the foregoing $R_3$ groups with an appropriate indole magnesium halide which is prepared by reaction of an appropriate indole with a lower-alkyl magnesium halide. The reaction is represented by the equation:

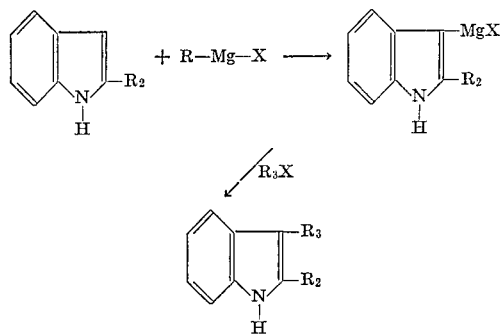

where $R_2$ and $R_3$ have the meanings given above, R represents lower-alkyl, and X represents halogen. The reaction is carried out at a temperature from 20° C. to about 100° C. in an organic solvent inert under the conditions of the reaction, for example diethyl ether, tetrahydrofuran, dioxane, and the like.

The intermediate 3-substituted-indoles of Formula II where $R_3$ is phenyl-lower-alkyl are prepared by reducing, with an alkali metal aluminum hydride, the corresponding compounds where $R_3$ is benzoyl or phenyl-lower-alkanoyl. The reaction takes place at temperatures in the range from about 20° C. to about 80° C. in an organic solvent inert under the conditions of the reaction, for example diethyl ether or tetrahydrofuran. It is preferred to carry out the reaction in tetrahydrofuran at the boiling point thereof.

The intermediate 3-substituted-indoles of Formula II where $R_3$ is 3-phenyl-3-oxopropenyl are prepared by reaction of a 2-$R_2$-3-indolecarboxaldehyde with a lower-alkyl α-benzoylacetate in the presence of a basic catalyst under aldol condensation conditions, and saponification and decarboxylation of the resulting 2-$R_2$-3-(3-phenyl-3-oxo-2-carbo-lower-alkoxypropenyl)indole. Suitable basic catalysts are pyridine, alkali metal alkoxides, or tri-lower-alkylamines. The reaction is preferably carried out in an organic solvent inert under the conditions of the recation, for example pyridine or lower-alkanols.

The method is represented by the equations:

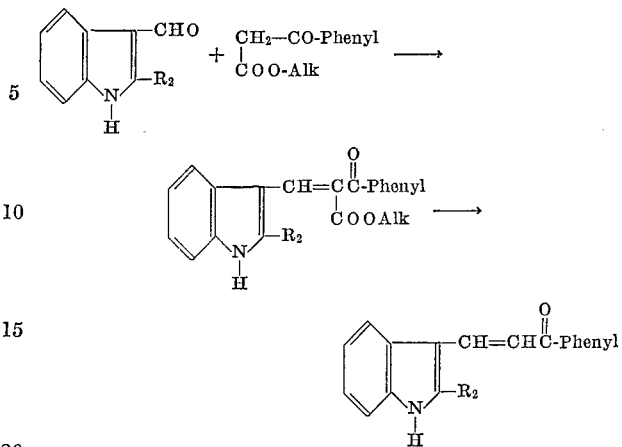

The compounds of Formula Ia where $R_3$ is phenyl-lower-alkanoyl, benzoyl, thiophenecarbonyl, furancarbonyl, pyridinecarbonyl, isoxazolecarbonyl, thiazolecarbonyl, isothiazolecarbonyl, or phenyl-lower-alkenoyl are prepared by reaction of a 2-(2-$R_2$-2-oxoethyl)cyclohexanone with an amino acid ester, $NH_2$—Y—$COOR_1$ in glacial acetic acid and reaction of the resulting lower-alkyl (4,5,6,7-tetrahydro-1-indole)-lower-alkanoate with the corresponding acid halide ($R_3$—X) in the presence of a Lewis acid, for example, stannic chloride or boron trifluoride in an organic solvent inert under the conditions of the reaction, for example diethyl ether, tetrahydrofuran, or dioxane. The reactions are represented by the equations:

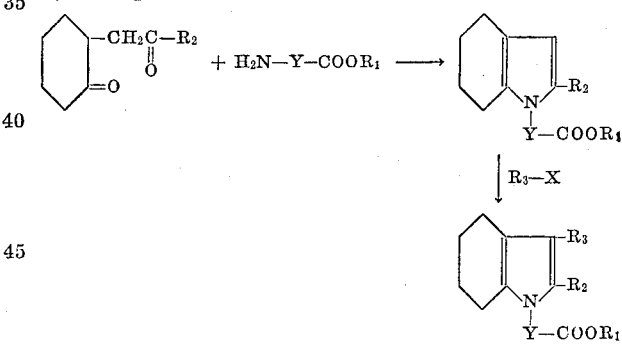

where $R_1$, $R_2$, $R_3$, and Y have the meanings given above.

The compounds of Formula Ia where $R_2$ is lower-alkyl and $R_3$ is phenyl are prepared by reaction of a 2-(1-phenyl-2-oxo-lower-alkyl)cyclohexanone having the formula:

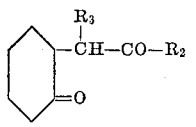

with an amino acid having the formula $$H_2N-Y-COOR_1$$

where $R_1$ is hydrogen, $R_2$ is lower-alkyl, and $R_3$ is phenyl. The reaction is carried out in an acidic medium, for example glacial acetic acid.

The 2-(1-phenyl-2-oxo-lower-alkyl)cyclohexanones are prepared by the method of Baumgartner et al., J. Am. Chem. Soc., 80, 6611 (1958) by reacting cyclohexanone-pyrrolidine enamine with an appropriate α-bromo-α-phenylacetone and hydrolyzing the resulting enamine haloketone adduct.

The compounds of Formulas I and Ia where $R_1$ is hydrogen are interconvertible with the compounds where $R_1$ is lower-alkyl, and moreover the acids are interconvertible with salts, for example alkali metal or alkaline earth salts, or ammonium or amine salts, e.g. N-methylglucamine, and the salts are considered to be the full equivalents of the acids and esters here-claimed. Thus the acids ($R_1$ is hydrogen) are prepared from the esters ($R_2$ is lower-alkyl) by saponification of the latter with alkali. The salts are obtained from the corresponding acids by reaction of the later with one molar equivalent of an appropriate base, for example an alkali metal hydroxide, alkaline earth hydroxide, ammonia or an amine, and isolation of the product from a neutral or basic medium. The lower-alkyl esters ($R_1$ is lower-alkyl) are obtained from the corresponding acids by esterification of the latter with a lower-alkanol in the presence of a mineral acid.

In addition to the use as starting materials or reactants of the indoles of Formula II or $R_2$-benzyl ketone (or aldehyde) phenylhydrazones of Formula III, or benzoyl halides, or phenyl-lower-alkanoyl halides, or phenyl-lower alkenoyl halides unsubstituted in the benzenoid rings thereof, other equivalently functioning reactants may be employed to produce the desired novel compositions of this invention. For example, instead of employing 3-substituted-indoles of Formula II unsubstituted in the benzenoid ring, or $R_2$-benzyl ketone (or aldehyde) phenylhydrazones of Formula III, or benzoyl halides, or phenyl-lower-alkanoyl halides, or phenyl-lower-alkenoyl halides unsubstituted in the phenyl ring thereof, such compounds substituted in the benzenoid or phenyl rings by one or more members of the group consisting of halogen (including fluorine, chlorine, bromine, and iodine), lower-alkyl, lower-alkoxy, lower-alkylmercapto, lower-alkylsulfinyl, lower-alkylsulfonyl, nitro, amino, lower-alkanoylamino, di-lower-alkylamino, trifluoromethyl, methylenedioxy, ethylenedioxy, lower-alkanoyloxy, and hydroxy can also be employed. In such instances, the same reaction conditions used in the previously described reactions can be used, and such substituted reactants afford the correspondingly substituted final products of Formula I which are considered to be the full equivalents of the unsubstituted compounds herein claimed, as illustrated by the following equations:

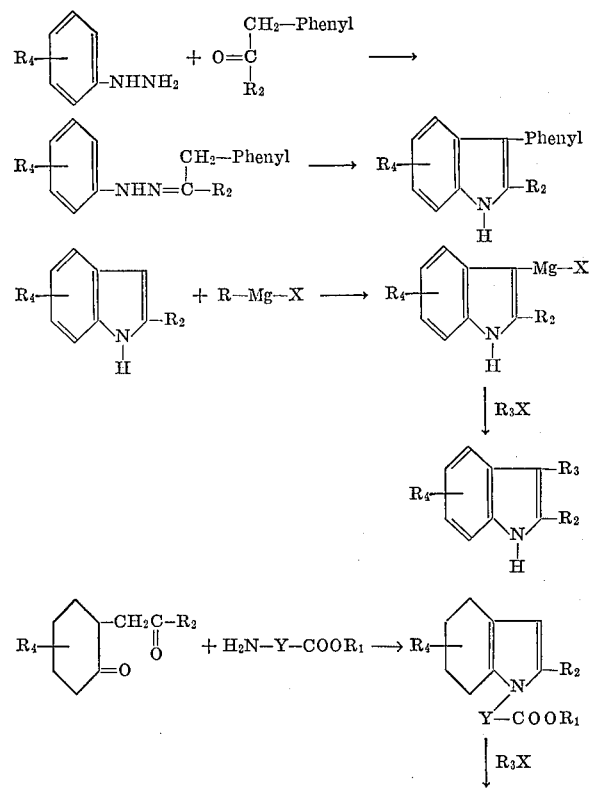

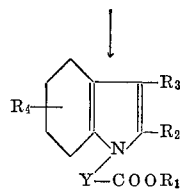

where $R_1$, $R_2$, X, and Y have the meanings given above, and $R_4$ or the benzenoid substituent on the phenyl ring of $R_3$ is phenyl, phenyl-lower-alkanoyl, benzoyl, phenyl-lower-alkyl, phenyl-lower-alkenoyl, or 3-phenyl-3-oxopropenyl are each from one to four substituents selected from the group consisting of halogen, lower-alkyl, lower-alkoxy, lower-alkylmercapto, lower-alkylsulfinyl, lower-alkylsulfonyl, nitro, amino, lower-alkanoylamino, di-lower-alkylamino, trifluoromethyl, methylenedioxy, ethylenedioxy, lower-alkanoyloxy, and hydroxy.

The compounds of Formulas I and II are anti-inflamatory agents as determined in standard and recognized pharmacological tests as described hereinbelow.

Anti-inflammatory activity of the compounds was determined by the inhibition of carrageenin-induced local foot edema in fasted rats generally by the method described by Winter et al., Proc. Soc. Exp. Biol. Med., 111, 544 (1962). The tests were carried out in male Sprague-Dawley rats weighing approximately 100 to 115 grams from which all food was withdrawn twenty-four hours prior to medication. The rats were divided into groups of at least five rats per group, and suspensions of the compounds in gum tragacanth were administered by stomach tube in a volume of 1 ml. per 100 g. of body weight. A control group of animals received only the gum tragacanth. This treatment was followed one hour later by injection into the plantar tissue of the right hind paw of all test and control animals of 0.05 ml. of a 1% aqueous suspension of carrageenin. As a control, the left hind paw was similarly injected with saline. Swelling of the carrageenin-injected paw reached a peak in from three to five hours, and the increase in swelling three hours after injection of the carrageenin was adopted as a measure of effect. Three hours following carrageenin injection the rats were sacrificed and the hind paws were cut off at the tibio-calcaneo-talar joint and weighed on a Mettler H5 balance. The weight difference between the carrageenin-injected foot and the saline-injected foot was taken as the weight of edema. The difference between the average weights of edema of the medicated and the control, or unmedicated, groups was expressed as percent inhibition of carrageenin-induced edema by the administered test compound. The results were expressed either in terms of the percent inhibition at a dose of 100 mg./kg. or in terms of the $AED_{40}$, the Average Effective Dose producing 40% inhibition of the inflammation, the latter value being calculated from a dose-response curve. The compounds were thus found to have an $AED_{40}$ in the range from 17 to 110 mg./kg. The toxicities of the compounds, expressed in terms of the Approximate Lethal Dose$_{50}$ ($ALD_{50}$), determined on oral administration in rats, were found to be in the range from 800 to >1000 mg./kg.

Although the compounds are less active on a weight-to-weight basis than the known anti-inflammatory agent, [1-(4-chlorobenzoyl)-5-methoxy-2-methyl-3-indole] acetic acid (indomethacin), they are relatively less toxic, i.e. have a more favorable ratio of the toxic to the active dose.

The compounds can be prepared for use by dissolving or suspending them in aqueous alcohol, glycol or oil solution, or oil-in-water emulsions in the same manner as conventional medicinal substances are prepared. Alternatively, they can be incorporated in unit dosage form as tablets or capsules for oral administration either alone or in combination with suitable adjuvants such as calcium carbonate, starch, lactose, talc, magnesium stearate, gum acacia, and the like. The compounds are administered to any suitable mammalian host in a does range of 2–100 mg./kg.

The chemical structures of the compounds of the invention are established by their mode of synthesis and are corroborated by infrared and ultraviolet spectra and by the correspondence between calculated values for the elements and values found by chemical analysis.

The following examples will further illustrate specific embodiments without the invention being limited thereto. The melting points are uncorrected.

EXAMPLE 1

(A) 3-benzoylindole [II: $R_2$ is H; $R_3$ is $C_6H_5CO$; $R_4$ is H].—To a solution of 160 ml. of a 3 M ether solution of ethyl magnesium bromide diluted with 100 ml. of absolute ether was added with stirring, over a period of forty-five minutes, a solution of 50 g. (0.43 mole) of indole in 300 ml. of absolute ether while maintaining the temperature at 0–5° C. The resulting yellow suspension was allowed to warm to 15° C. for thirty minutes and was then cooled to 0–5° C. and treated with a solution of 60 g. (0.43 mole) of benzoyl chloride in 90 ml. of absolute ether. The mixture was then refluxed for two and one-half hours, allowed to stand at room temperature overnight, treated with 400 ml. of saturated aqueous ammonium chloride, and the ether-soluble product was extracted with 1500 ml. of tetrahydrofuran. The extracts were dried over anhydrous sodium sulfate and evaporated to dryness in vacuo to give a light pink solid which was recrystallized from ethyl acetate giving 50 g. of 3-benzoylindole, M.P. 237–239° C.

(B) Ethyl α-(3-benzoyl-1-indole)acetate [I: $R_1$ is $C_2H_5$; $R_2$ is H; $R_3$ is $C_6H_5CO$; $R_4$ is H; Y is $CH_2$].—A mixture of 20 g. (0.09 mole) of 3-benzoylindole and 5.1 g. (0.11 mole) of a 52% suspension of sodium hydride in mineral oil in 250 ml. of dry dimethylformamide was stirred at room temperature for forty-five minutes. The resulting orange, almost clear solution was treated all at once with 17.9 g. (0.11 mole) of ethyl bromoacetate, and the resulting solution was stirred for two hours and then allowed to stand for six hours. The clear, red-brown solution was diluted with 2 liters of ethyl acetate, washed with three 500 ml. portions of water, once with saturated brine, dried over anhydrous sodium sulfate and evaporated to dryness in vacuo to give 30.2 g. of ethyl α-(3-benzoyl-1-indole)-acetate.

(C) α-(3-benzoyl-1-indole)acetic acid [I: $R_1$ and $R_2$ are H; $R_3$ is $C_6H_5CO$; $R_4$ is H; Y is $CH_2$].—A solution of 30.2 g. (0.10 mole) of ethyl α-(3-benzoyl-1-indole)acetate in 400 ml. of ethanol and 105 ml. of 10% aqueous sodium hydroxide was refluxed for two hours, and the solvent removed by evaporation in vacuo. The residual yellow gum was dissolved in two liters of 50% ethanol/water and the solution acidified to pH 1 with 33% hydrochloric acid. The flocculent precipitate was collected, dried, and recrystallized twice from ethanol to give 18.1 g. of α-(3-benzoyl-1-indole)acetic acid, M.P. 216–218° C.

*Analysis.*—Calcd. for $C_{17}H_{13}NO_3$ (percent): C, 73.11; H, 4.69; N, 5.03. Found (percent): C, 73.34; H, 4.82; N, 5.15.

EXAMPLE 2

(A) 3-benzoyl-2-methylindole [II: $R_2$ is $CH_3$; $R_3$ is $C_6H_5CO$; $R_4$ is H] was prepared by reaction of 103 g. (0.73 mole) of benzoyl chloride with the Grignard reagent prepared from 96 g. (0.73 mole) of 2-methylindole and 275 ml. (0.82 mole) of a 3 M ether solution of ethyl magnesium bromide in a total volume of about 950 ml. of diethyl ether using the procedure described above in Example 1(A). The crude product was recrystallized from ethyl acetate to give 93.5 g. of 3-benzoyl-2-methylindole, M.P. 183–184° C.

(B) Ethyl α-(3-benzoyl-2-methyl-1-indole)acetate [I: $R_1$ is $C_2H_5$; $R_2$ is $CH_3$; $R_3$ is $C_6H_5CO$; $R_4$ is H; Y is $CH_2$] was prepared by reacting 20.0 g. (0.085 mole) of 3-benzoyl-2-methylindole with 17.0 g. (0.10 mole) of ethyl bromoacetate in 250 ml. of dry dimethylformamide in the presence of 4.85 g. (0.103 mole) of a 52% suspension of sodium hydride in mineral oil using the procedure described above in Example 1(B). There was thus obtained 35.2 g. of ethyl α-(3-benzoyl-2-methyl-1-indole)acetate as a brown oil.

(C) α-(3-benzoyl-2-methyl-1-indole)acetic acid [I: $R_1$ is H; $R_2$ is $CH_3$; $R_3$ is $C_6H_5CO$; $R_4$ is H; Y is $CH_2$] was prepared by saponification of 35.2 g. (0.11 mole) of ethyl α-(3-benzoyl-2-methyl-1-indole)acetate in a solution of 400 ml. of ethanol and 100 ml. of 10% aqueous sodium hydroxide using the procedure described above in Example 1(C). The crude product was recrystallized twice from ethanol to give 13.2 g. of α-(3-benzoyl-2-methyl-1-indole) acetic acid, M.P. 211–212° C.

*Analysis.*—Calcd. for $C_{18}H_{15}NO_3$ (percent): C, 73.70; H, 5.15; N, 4.78. Found (percent): C, 74.85; H, 5.24; N, 5.07.

EXAMPLE 3

(A) Ethyl β-(3-benzoyl-2-methyl-1-indole)propionate [I: $R_1$ is $C_2H_5$; $R_2$ is $CH_3$; $R_3$ is $C_6H_5CO$; $R_4$ is H; Y is $CH_2CH_2$] was prepared by reacting 20.0 g. (0.085 mole) of 3-benzoyl-2-methylindole with 18.5 g. (0.102 mole) of ethyl β-bromo-propionate in 250 ml. of dry dimethylformamide in the presence of 4.8 g. (0.103 mole) of a 52% suspension of sodium hydride in mineral oil using the procedure described above in Example 1(B). There was thus obtained 34.0 g. of ethyl β-(3-benzoyl-2-methyl-1-indole) propionate as a brown oil.

(B) β-(3-benzoyl-2-methyl-1-indole)propionic acid [I: $R_1$ is H; $R_2$ is $CH_3$; $R_3$ is $C_6H_5CO$; $R_4$ is H; Y is $CH_2CH_2$] was prepared by saponification of 34.0 g. (0.10 mole) of ethyl β-(3-benzoyl-2-methyl-1-indole)propionate in a solution of 400 ml. of ethanol and 100 ml. of 10% aqueous sodium hydroxide using the procedure described above in Example 1(C). The crude product was recrystallized twice from ethanol to give 13.5 g. of β-(3-benzoyl-2-methyl-1-indole)propionic acid, M.P. 205–207° C.

*Analysis.*—Calcd. for $C_{19}H_{17}NO_3$ (percent): C, 74.25; H, 5.58; N, 4.56. Found (percent): C, 74.85; H, 5.80; N, 5.07.

EXAMPLE 4

(A) 3-(4-chlorobenzoyl)indole [II: $R_2$ is H; $R_3$ is 4-$ClC_6H_4CO$; $R_4$ is H] was prepared by reaction of 74.0 g. (0.43 mole) of 4-chlorobenzoyl chloride with the Grignard reagent prepared from 50.0 g. (0.43 mole) of indole and 160 ml. (0.49 mole) of a 3 M ether solution of ethyl magnesium bromide in a total volume of about 450 ml. of diethyl ether using the procedure described above in Example 1(A). The crude product was recrystallized from ethyl acetate to give 52.6 g. of 3-(4-chlorobenzoyl)indole M.P. 180–200° C.

(B) Ethyl α-[3-(4-chlorobenzoyl)-1-indole]acetate [I: $R_1$ is $C_2H_5$; $R_2$ is H; $R_3$ is 4-$ClC_6H_4CO$; $R_4$ is H; Y is $CH_2$] was prepared by reaction of 15.7 g. (0.94 mole) of ethyl bromoacetate with 20.0 g. (0.078 mole) of 3-(4-chlorobenzoyl)-indole in 250 ml. of anhydrous dimethylformamide in the presence of 4.5 g. (0.094 mole) of a 50% suspension of sodium hydride in mineral oil using the procedure described above in Example 1(B). There was thus obtained 31.7 g. of ethyl α-[3-(4-chlorobenzoyl)-1-indole]actate as an off-white solid.

(C) α-[3-(4-chlorobenzoyl)-1-indole]acetic acid [I: $R_1$ and $R_2$ are H; $R_3$ is 4-$ClC_6H_4CO$; $R_4$ is H; Y is $CH_2$] was prepared by saponification of 31.7 g. (0.093 mole) of ethyl α-[3-(4-chlorobenzoyl)-1-indole]acetate in a solution of 400 ml. of ethanol and 100 ml. of 10% aqueous sodium hydroxide using the procedure described above in Example 1(C). The crude product was recrystallized once from ethanol/benzene and once from ethanol to give 13.6 g. of α-[3-(4-chlorobenzoyl)-1-indole]acetic acid, M.P. 235–236° C.

*Analysis.*—Calcd. for $C_{17}H_{12}ClNO_3$ (percent): N, 4.47; Cl, 11.30. Found (percent): N, 4.72; Cl, 11.09.

EXAMPLE 5

(A) 3-(4-chlorobenzoyl)-2-methylindole [II: $R_2$ is $CH_3$; $R_3$ is 4-$ClC_6H_4CO$; $R_4$ is H] was prepared by reaction of 133.5 g. (0.96 mole) of 4-chlorobenzoyl chloride with the Grignard reagent prepared from 100 g. (0.70 mole) of 2-methylindole and 300 ml. (0.90 mole) of a 3 M ether solution of ethyl magnesium bromide in a total volume of about 1100 ml. of absolute diethyl ether using the procedure described above in Example 1(A). The crude product was recrystallized from ethyl acetate to give 157 g. of 3-(4-chlorobenzoyl)-2-methylindole, M.P. 181–183° C.

(B) Ethyl α-[3-(4-chlorobenzoyl)-2-methyl-1-indole]acetate [I: $R_1$ is $C_2H_5$; $R_2$ is $CH_3$; $R_3$ is 4-$ClC_6H_4CO$; $R_4$ is H; Y is $CH_2$] was prepared by reaction of 74.3 g. (0.45 mole) of ethyl bromoacetate with 100 g. (0.37 mole) of 3-(4-chlorobenzoyl)-2-methylindole in one liter of anhydrous dimethylformamide in the presence of 21.0 g. (0.46 mole) of a 52% suspension of sodium hydride in mineral oil using the procedure described above in Example 1(B). There was thus obtained 146.4 g. of crude product as a peach colored solid of which 25 g. was recrystallized from ethanol to give 15.1 g. of ethyl α-[3-(4-chlorobenzoyl)-2-methyl-1-indole]acetate as a white, peach-tinted solid, M.P. 145–146° C.

*Aalysis.*—Calcd. for $C_{20}H_{18}ClNO_3$ (percent): C, 67.51; H, 5.10; N, 3.94; Cl, 9.97. Found (percent): C, 67.74; H, 5.19; N, 3.93; Cl, 9.84.

(C) α-[3-(4-chlorobenzoyl)-2-methyl-1-indole]acetic acid [I: R is H; $R_2$ is $CH_3$; $R_3$ is 4-$ClC_6H_4CO$; $R_4$ is H; Y is $CH_2$] was prepared by saponification of 39 g. (0.11 mole) of ethyl α-[3-(4-chlorobenzoyl)-2-methyl-1-indole]acetate in a solution of 800 ml. of ethanol and 200 ml. of 10% aqueous sodium hydroxide using the procedure described above in Example 1(C). The crude product was recrystallized twice from ethanol and dried in vacuo at 100° C. to give 10.6 g. of α-[3-(4-chlorobenzoyl)-2-methyl-1-indole]acetate acid, M.P. 233–236° C.

*Analysis.*—Calcd. for $C_{18}H_{14}ClNO_3$ (percent): C, 65.95; H, 4.30; N, 4.27; Cl, 10.82. Found (percent): C, 65.70; H, 4.48; N, 4.62; Cl, 11.05.

EXAMPLE 6

(A) Ethyl β-[3-(4-chlorobenzoyl)-2-methyl-1-indole]propionate [I: $R_1$ is $C_2H_5$; $R_2$ is $CH_3$; $R_3$ is 4-$ClC_6H_4CO$; $R_4$ is H; Y is $CH_2CH_2$] was prepared by reaction of 20.8 g. (0.115 mole) of ethyl β-bromopropionate with 28 g. (0.104 mole) of 3-(4-chlorobenzoyl)-2-methylindole in the presence of 5.3 g. (0.12 mole) of a 52% suspension of sodium hydride in mineral oil in a total of 250 ml. of dimethylformamide using the procedure described above in Example 1(B). There was thus obtained 36 g. of ethyl β-[3-(4-chlorobenzoyl)-2-methyl-1-indole]propionate as a yellow, viscous oil.

(B) β-[3-(4-chlorobenzoyl)-2-methyl-1-indole]propionic acid [I: $R_1$ is H; $R_2$ is $CH_3$; $R_3$ is 4-$ClC_6H_4CO$; $R_4$ is H; Y is $CH_2CH_2$] was prepared by saponification of 36 g. (0.098 mole) of ethyl β-[3-(4-chlorobenzoyl)-2-methyl-1-indole]propionate in a solution of 800 ml. of ethanol and 200 ml. of 10% aqueous sodium hydroxide using the procedure described above in Example 1(C). The crude product was recrystallized twice from tetrahydrofuran to give 11.0 g. of β-[3-(4-chlorobenzoyl)-2-methyl-1-indole]propionic acid, M.P. 224–227° C. (dec.).

*Analysis.*—Calcd. for $C_{19}H_{16}ClNO_3$ (percent): N, 4.10; Cl, 10.37. Found (percent): N, 4.34; Cl, 10.48.

EXAMPLE 7

(A) 3-(3,4-dichlorobenzoyl)-2-methylindole [II: $R_2$ is $CH_3$; $R_3$ is 3,4-$Cl_2C_6H_3CO$; $R_4$ is H] was prepared by reaction of 100 g. (0.48 mole) of 3,4-dichlorobenzoyl chloride with the Grignard reagent prepared from 62.5 g. (0.48 mole) of 2-methylindole and 191 ml. (0.57 mole) of an approximately 3 M ether solution of methyl magnesium bromide in a total of 800 ml. of anhydrous diethyl ether using the procedure described above in Example 1(A). There was thus obtained 20.8 g. of 3-(3,4-dichlorobenzoyl)-2-methylindole, M.P. 229–230° C.

*Analysis.*—Calcd. for $C_{16}H_{11}Cl_2NO$ (percent): C, 63.17; H, 3.64; N, 4.60; Cl, 23.32. Found (percent): C, 62.95; H, 3.45; N, 4.46; Cl, 23.09.

3-(3,4-dichlorobenzoyl)-2-methylindole was studied in electrolyte excretion modification tests in rats, and found to be active as a kaluretic agent at a dose of 30 mg./kg. (s.c.). The test for electrolyte excretion modification was carried out as follows: Male Charles River CD rats weighing 180 to 195 g. were maintained in the laboratory for one week to equilibrate them, during which time water and food were provided ad libitum. All food was removed from the cages of the test animals approximately eighteen hours preceding the test, and water was removed two and one-half hours preceding the test. All test animals were then voided of urine by applying pressure with the fingers over the region of the bladder, and after weighing, were divided into experimental groups and placed into individual metabolism cages equipped for urine collection. All rats were then administered intraperitoneally 10 ml. of Krebs Ringer phosphate solution, and the test compound, prepared as a suspension in 10% ethanol-cottonseed oil, was injected subcutaneously immediately following administration of the Krebs Ringer solution. A second and third injection of the test compound were administered two and four hours later, care being taken at all times to prevent urine loss by holding the animal over the collection funnel while injecting. Twenty-four hours following the injection of the Krebs Ringer solution, the animals were again voided of urine while being held over the collection funnel. The animals were then sacrificed by injection of pentobarbital prior to final weighing. Urine volumes were recorded in each case, and the metabolism cages were washed down with small amounts of distilled water, and the urine samples with the water washings were diluted to 50 ml. with distilled water. Suitable aliquots were then analyzed for sodium, potassium, chloride, magnesium, phosphorus, calcium, and nitrogen by standard analytical procedures.

(B) Ethyl α-[3-(3,4-dichlorobenzoyl)-2-methyl-1-indole]acetate [I: $R_1$ is $C_2H_5$; $R_2$ is $CH_3$; $R_3$ is 3,4-$Cl_2C_6H_3CO$; $R_4$ is H; Y is $CH_2$] was prepared by reaction of 23.0 g. (0.14 mole) of ethyl bromoacetate with 35.0 g. (0.12 mole) of 3-(3,4-dichlorobenzoyl)-2-methylindole in 250 ml. of anhydrous dimethylformamide and in the presence of 5.92 g. (0.138 mole) of a 56% suspension of sodium hydride in mineral oil using the procedure described above in Example 1(B). There was thus obtained 48 g. of ethyl α-[3,4-dichlorobenzoyl)-2-methyl-1-indole]acetate as a yellow oil.

(C) α-[3-(3,4-dichlorobenzoyl)-2-methyl-1-indole]acetic acid [I: $R_1$ is H; $R_2$ is $CH_3$; $R_3$ is 3,4-$Cl_2C_6H_3CO$; $R_4$ is H; Y is $CH_2$] was prepared by saponification of 48 g. (0.12 mole) of ethyl α-[3-(3,4-dichlorobenzoyl)-2-methyl-1-indole]acetate in a solution of 500 ml. of ethanol and 125 ml. of 10% aqueous sodium hydroxide using the procedure described above in Example 1(C). The crude product was recrystallized three times from ethanol giving 19.5 g. of α-[3-(3,4-dichlorobenzoyl)-2-methyl-1-indole]acetic acid, M.P. 212–214° C.

*Analysis.*—Calcd. for $C_{18}H_{13}Cl_2NO_3$ (percent): C, 59.68; H, 3.61; N, 3.87. Found (percent): C, 59.72; H, 3.70; N, 3.63.

EXAMPLE 8

(A) 3-(4-chlorobenzoyl)-6-methoxy-2-methylindole [II: $R_2$ is $CH_3$; $R_3$ is 4-$ClC_6H_4CO$; $R_4$ is 6-$CH_3O$] was prepared by reaction of 21.5 g. (0.123 mole) of 4-chlorobenzoyl chloride with the Grignard reagent prepared from 18 g. (0.11 mole) of 6-methoxy-2-methylindole and 64 ml. (0.12 mole) of a 2 M ether solution of methyl magnesium bromide in a total volume of about 400 ml. of tetrahydrofuran using the procedure described above in Example 1(A). The crude product of M.P.

145–170° C. consisting of 1,3-di-(4-chlorobenzoyl)-6-methoxy-2-methylindole, was dissolved in ethanol and benzene and warmed gently with a solution of 6 g. of sodium hydroxide in 50 ml. of $H_2O$ to hydrolyze off the 1-(4-chlorobenzoyl) group introduced during the reaction. The product was recrystallized from benzene to give 3-(4-chlorobenzoyl)-6-methoxy-2-methylindole as pale yellow, micro crystals, M.P. 206–208.5° C.

*Analysis.*—Calcd. for $C_{17}H_{14}ClNO_2$ (percent): C, 68.11; H, 4.71; Cl, 11.83; N, 4.68. Found (percent): C, 68.68; H, 4.74; Cl, 11.67; N, 4.70.

(B) Ethyl α-[3-(4-chlorobenzoyl)-6-methoxy-2-methyl-1-indole]acetate [I: $R_1$ is $C_2H_5$; $R_2$ is $CH_3$; $R_3$ is 4-$ClC_6H_4CO$; $R_4$ is 6-$CH_3O$; Y is $CH_2$] was prepared by reaction of 1.39 g. (0.019 mole) of ethyl bromoacetate with 5.2 g. (0.017 mole) of 3-(4-chlorobenzoyl)-6-methoxy-2-methylindole in the presence of 0.88 g. (0.019 mole) of a 52% suspension of sodium hydride in mineral oil in 50 ml. of dimethylformamide using the procedure described above in Example 1(B). There was thus obtained 6 g. of ethyl α-[3-(4-chlorobenzoyl)-6-methoxy-2-methyl-1-indole]acetate as a light brown gum.

(C) α - [3-(4-chlorobenzoyl)-6-methoxy-2-methyl-1-indole]acetic acid [I: $R_1$ is H; $R_2$ is $CH_3$; $R_3$ is 4-$ClC_6H_4CO$; $R_4$ is 6-$CH_3O$; Y is $CH_2$] was prepared by saponification of 6 g. (0.016 mole) of ethyl α-[3-(4-chlorobenzoyl)-6-methoxy-2-methyl-1-indole]acetate in a solution of 400 ml. of ethanol and 50 ml. of 10% aqueous sodium hydroxide using the procedure described above in Example 1(C). The crude product was recrystallized from ethanol to give 4.0 g. of α-[3-(4-chlorobenzoyl)-6-methoxy-2-methyl-1-indole]acetic acid, M.P. 230.5–234° C.

*Analysis.*—Calcd. for $C_{19}H_{16}ClNO_4$ (percent): C, 63.78; H, 4.51; Cl, 9.91. Found (percent): C, 63.68; H, 4.58; Cl, 10.19.

EXAMPLE 9

(A) 3 - (4-methylbenzoyl)-2-methylindole [II: $R_2$ is $CH_3$; $R_3$ is 4-$CH_3C_6H_4CO$; $R_4$ is H] was prepared by reaction of 59 g. (0.38 mole) of 4-methylbenzoyl chloride with the Grignard reagent prepared from 50 g. (0.38 mole) of 2-methylindole and 140 ml. (0.42 mole) of a 3 M ether solution of ethyl magnesium bromide in a total of about 550 ml. of absolute diethyl ether using the procedure described above in Example 1(A). The crude product was recrystallized from ethyl acetate to give 67 g. of 3-(4-methylbenzoyl)-2-methyl-indole, M.P. 202–204.5° C.

(B) Ethyl α-[3-(4-methylbenzoyl)-2-methyl-1-indole]acetate [I: $R_1$ is $C_2H_5$; $R_2$ is $CH_3$; $R_3$ is 4-$CH_3C_6H_4CO$; $R_4$ is H; Y is $CH_2$] was prepared by reaction of 23.4 g. (0.14 mole) of ethyl bromoacetate with 32 g. (0.13 mole) of 3-(4-methylbenzoyl)-2-methylindole in the presence of 5.4 g. (0.14 mole) of a 62% suspension of sodium hydride in mineral oil in 250 ml. of dimethylformamide using the procedure described above in Example 1(B). There was thus obtained 62 g. of ethyl α-[3-)4-methylbenzoyl)-2-methyl-1-indole]acetate as a yellow solid.

(C) α - [3-(4-methylbenzoyl)-2-methyl-1-indole]acetic acid [I: $R_1$ is H; $R_2$ is $CH_3$; $R_3$ is 4-$CH_3C_6H_4CO$; $R_4$ is H; Y is $CH_2$] was prepared by saponification of 62 g. (0.19 mole) of ethyl α-[3-(4-methylbenzoyl)-2-methyl-1-indole]acetate in a solution of 450 ml. of ethanol and 125 ml. of 35% aqueous sodium hydroxide using the procedure described above in Example 1(C). The crude product was recrystallized three times from ethanol to give 21.5 g. of α-[3-(4-methylbenzoyl)-2-methyl-1-indole]acetic acid, M.P. 226–229.5 c. (dec.).

*Analysis.*—Calcd. for $C_{19}H_{17}NO_3$ (percent): C, 74.25; H, 5.58; N, 4.56. Found (percent): C, 74.52; H, 5.68; N, 4.57.

EXAMPLE 10

(A) 3-(4-methoxybenzoyl)-2-methylindole [II: $R_2$ is $CH_3$; $R_3$ is 4-$CH_3OC_6H_4CO$; $R_4$ is H] was prepared by reaction of 75.9 g. (0.45 mole) of 4-methoxybenzoyl chloride with the Grignard reagent prepared from 50 g. (0.38 mole) of 2-methylindole and 150 ml. (0.45 mole) of a 3 M ether solution of ethyl magnesium bromide in a total of about 550 ml. of absolute ether using the procedure described above in Example 1(A). There was thus obtained 111.4 g. of 3-(4-methoxybenzoyl)-2-methylindole.

(B) Ethyl α - [3 - (4-methoxybenzoyl)-2-methyl-1-indole]acetate [I: $R_1$ is $C_2H_5$; $R_2$ is $CH_3$; $R_3$ is

4-$CH_3OC_6H_4CO$ $R_4$ is H; Y is $CH_2$] was prepared by reaction of 18.9 g. (0.113 mole) of ethyl bromoacetate with 25 g. (0.09 mole) of 3-(4-methoxybenzoyl)-2-methylindole in the presence of 5.3 g. (0.11 mole) of a 52% suspension of sodium hydride in mineral oil in 250 ml. of anhydrous dimethylformamide using the procedure described above in Example 1(B). There was thus obtained 41 g. of ethyl α-[3-(4-methoxybenzoyl)-2-methyl-1-indole]acetate as a red oil.

(C) α - [3 - (4-methoxybenzoyl)-2-methyl-1-indole] acetic acid [I: $R_1$ is H; $R_2$ is $CH_3$; $R_3$ is 4-$CH_3OC_6H_4CO$; $R_4$ is H; Y is $CH_2$] was prepared by saponification of 41 g. (0.12 mole) of ethyl α-[3-(4-methoxybenzoyl)-2-methyl-1-indole]acetate in a solution of 400 ml. of ethanol and 100 ml. of 10% aqueous sodium hydroxide using the procedure described above in Example 1(C). The crude product was recrystallized twice from ethanol to give 16.0 g. of α-[-3-(4-methoxybenzoyl)-2-methyl-1-indole] acetic acid, M.P. 208–210° C.

*Analysis.*—Calcd. for $C_{19}H_{17}NO_4$ (percent): C, 70.57; H, 5.30; N, 4.33. Found (percent): C, 70.74; H, 5.33; N, 4.69.

EXAMPLE 11

(A) 3-(4-trifluoromethylbenzoyl)-2-methylindole [II: $R_2$ is $CH_3$; $R_3$ is 4-$CF_3C_6H_4CO$; $R_4$ is H] was prepared by reaction of 50.0 g. (0.24 mole) of 4-trifluoromethylbenzoyl chloride with the Grignard reagent prepared by reacting 32.2 g. (0.24 mole) of 2-methylindole with 100 ml. (0.30 mole) of a 3 M ether solution of methyl magnesium bromide in a total volume of about 375 ml. of absolute diethyl ether using the procedure described above in Example 1(A). The crude product was recrystallized twice from ethyl acetate to give 42 g. of 3-(4-trifluoromethylbenzoyl)-2-methylindole M.P. 195–197° C.

3-(4-trifluoromethylbenzoyl)-2-methylindole, in standard serial dilution anti-vacterial tests, was found to be bacteriostatic against the organism *Staphylococcus aureus* at a concentration of 0.075 mg./ml. Antibacterial activity was determined using standard serial dilution tests as described, for example, by Bailey et al., J. Am. Pharm. Assn., Sc. Ed. 48, 212 (1959).

(B) Ethyl α - [3-(4-trifluoromethylbenzoyl)-2-methyl-1-indole]acetate [I: $R_1$ is $C_2H_5$; $R_2$ is $CH_3$; $R_3$ is

4-$CF_3C_6H_4CO$ $R_4$ is H; Y is $CH_2$] was prepared by reaction of 10.95 g. (0.099 mole) of ethyl bromoacetate with 25.0 g. (0.083 mole) of 3-(4-trifluoromethylbenzoyl)-2-methylindole in the presence of 4.25 g. (0.099 mole) of a 56% suspension of sodium hydride in mineral oil in 500 ml. of dimethylformamide using the procedure described above in Example 1(B). The crude product was recrystallized three times from ethanol to give 3.5 g. of ethyl α-[3-(4-trifluoromethylbenzoyl)-2-methyl-1-indole]acetate, M.P. 128–132° C.

*Analysis.*—Calcd. for $C_{21}H_{18}F_3NO_3$ (percent): C, 64.77; H, 4.66; F, 14.64. Found (percent): C, 64.96; H, 4.43; F. 14.11.

(C) α - [3 - (4-trifluoromethylbenzoyl)-2-methyl-1-indole]acetic acid [I: $R_1$ is H; $R_2$ is $CH_3$; $R_3$ is

4-$CF_3C_6H_4CO$ $R_4$ is H; Y is $CH_2$] was prepared by saponification of 28 g. (0.72 mole) of ethyl α-[3-(4-trifluoromethylbenzoyl)-2-methyl-1-indole]acetate in a solution of 400 ml. of ethanol and 100 ml. of 10% aqueous sodium hydroxide using the procedure described above in Example 1(C). The crude product was recrystallized from ethanol to give 2.7 g. of α-[3-(4-trifluoromethylbenzoyl)-2-methyl-1-indole] acetic acid, M.P. 228–231° C. (dec.).

*Analysis.*—Calcd. for $C_{19}H_{14}F_3NO_3$ (percent): C, 63.15; H, 3.90; N, 3.88; F, 15.77. Found (percent): C, 63.43; H, 4.05; N, 3.99; F, 15.50.

EXAMPLE 12

(A) Ethyl β-(3-benzoyl-1-indole)propionate [I: $R_1$ is $C_2H_5$; $R_2$ is H; $R_3$ is $C_6H_5CO$; $R_4$ is H; Y is $CH_2CH_2$] was prepared by reacting 19.0 g. (0.086 mole) of 3-benzolindole with 20 g. (0.12 mole) of ethyl β-bromopropionate in 250 ml. of dimethylformamide in the presence of 5.0 g. of a 52% suspension of sodium hydride in mineral oil using the procedure described above in Example 1(B). There was thus obtained 27.7 g. of ethyl β-(3-benzoyl-1-indole)propionate as a brown oil.

(B) β-(3-benzoyl-1-indole)propionic acid [I: $R_1$ and $R_2$ are H; $R_3$ is $C_6H_5CO$; $R_4$ is H; Y is $CH_2CH_2$] was prepared by saponification of 27.7 g. (0.086 mole) of ethyl β-(3-benzoyl-1-indole)propionate in 400 ml. of ethanol and 100 ml. of 10% aqueous sodium hydroxide using the procedure described above in Example 1(C). The crude product was recrystallized twice from ethanol giving 6.5 g. of β-(3-benzoyl-1-indole)-propionic acid, M.P. 190–193° C.

*Analysis.*—Calcd. for $C_{18}H_{15}NO_3$ (percent): C, 73.10; H, 5.15; N, 4.78. Found (percent): C, 73.42; H, 5.14; N, 4.61.

EXAMPLE 13

(A) 3-cinnamoyl-2-methylindole [II: $R_2$ is $CH_3$; $R_3$ is $C_6H_5CH=CHCO$; $R_4$ is H] was prepared by reaction of 64 g. (0.38 mole) of cinnamoyl chloride in 200 ml. of a 1:1 solution of ethyl ether and tetrahydrofuran with the Grignard reagent prepared from 50 g. (0.38 mole) of 2-methylindole and 138 ml. (0.41 mole) of a 3 M ether solution of ethyl magnesium bromide in a total volume of about 350 ml. of absolute ether using the procedure described above in Example 1(A). The crude product was recrystallized from ethyl acetate to give 36.5 g. of 3-cinnamoyl-2-methylindole, M.P. 153.5–156.5° C. resolidifies and melts at 166–168° C.).

*Analysis.*—Calcd. for $C_{18}H_{15}NO$ (percent): C, 82.73; H, 5.79; N, 5.36. Found (percent): C, 83.06; H, 6.07; N, 5.09.

(B) Ethyl α-(3-cinnamoyl-2-methyl-1-indole)acetate [I: $R_1$ is $C_2H_5$; $R_2$ is $CH_3$; $R_3$ is $C_6H_5CH=CHCO$; $R_4$ is H; Y is $CH_2$] was prepared by reacting 16.6 g. (0.062 mole) of 3-cinnamoyl-2-methylindole with 11.3 g. 0.068 mole) of ethyl bromoacetate in 125 ml. of dry dimethylformamide in the presence of 2.68 g. (0.069 mole) of a 62% suspension of sodium hydride in mineral oil using the procedure described above in Example 1(B). There was thus obtained 20 g. of ethyl α-(3-cinnamoyl-2-methyl-1-indole)acetate, M.P. 110–112° C.

(C) α-(3-cinnamoyl-2-methyl-1-indole)acetic acid [I: $R_1$ is H; $R_2$ is $CH_3$; $R_3$ is $C_6H_5CH=CHCO$; $R_4$ is H; Y is $CH_2$] was prepared by saponification of 20 g. (0.058 mole) of ethyl α-(3-cinnamoyl-2-methyl-1-indole)acetate in a solution containing 30 g. of potassium hydroxide in 250 ml. of methanol using the procedure described above in Example 1(C). The crude product was recrystallized from ethanol to give 9.6 g. of α-(3-cinnamoyl-2-methyl-1-indole)acetic acid, M.P. 220–225° C.

*Analysis.*—Calcd. for $C_{20}H_{17}NO_3$ (percent): C, 75.22; H, 5.37; N, 4.39. Found (percent): C, 75.52; H, 5.47; N, 4.20.

EXAMPLE 14

(A) Ethyl β-(3-cinnamoyl-2-methyl-1-indole)propionate [I: $R_1$ is $C_2H_5$; $R_2$ is $CH_3$; $R_3$ is $C_6H_5CH=CHCO$; $R_4$ is H; Y is $CH_2CH_2$] was prepared by reacting 14.5 g. (0.056 mole) of 3-cinnamoyl-2-methylindole with 11.05 g. (0.061 mole) of ethyl β-bromo-propionate in 100 ml. of dry dimethylformamide in the presence of 2.42 g. (0.061 mole) of a 61% suspension of sodium hydride in mineral oil using the procedure described above in Example 1(B). There was thus obtained 20 g. of ethyl β-(3-cinnamoyl-2-methyl-1-indole)propionate as a yellow gum.

(B) β-(3-cinnamoyl-2-methyl-1-indole)propionic acid [I: $R_1$ is H; $R_2$ is $CH_3$; $R_3$ is $C_6H_5CH=CHCO$; $R_4$ is H; Y is $CH_2CH_2$] was prepared by saponification of 20 g. (0.063 mole) of ethyl β-(3-cinnamoyl-2-methyl-1-indole)propionate in a solution containing 30 g. of potassium hydroxide dissolved in 200 ml. of methanol using the procedure described above in Example 1(C). The crude product was recrystallized from ethanol to give 7.5 g. of β-(3-cinnamoyl-2-methyl-1-indole)propionic acid, M.P. 164–166° C. (resolidifies and melts 190–191° C.).

*Analysis.*—Calcd. for $C_{21}H_{19}NO_3$ (percent): C, 75.65; H, 5.74; N, 4.20. Found (percent): C, 75.66; H, 5.66; N, 3.93.

EXAMPLE 15

(A) 3-benzoyl-2-methyl-5,6-dimethoxyindole [II: $R_2$ is $CH_3$; $R_3$ is $C_6H_5CO$; $R_4$ is 5,6-$(CH_3O)_2$] was prepared by reaction of 14.0 g. (0.1 mole) of benzoyl chloride with the Grignard reagent prepared from 19.1 g. (0.1 mole) of 2-methyl-5,6-dimethoxyindole and 37 ml. (0.11 mole) of a 3 M ether solution of ethyl magnesium bromide in a total volume of 150 ml. of tetrahydrofuran using the procedure described above in Example 1(A). The crude product was recrystallized from ethanol giving 6.1 g. of 3-benzoyl-2-methyl-5,6-dimethoxyindole, M.P. 210–212° C.

*Analysis.*—Calcd. for $C_{18}H_{17}NO_3$ (percent): C, 73.20; H, 5.80; N, 4.74. Found (percent): C, 73.21; H, 5.82; N, 4.57.

(B) Ethyl α-(3-benzoyl-2-methyl-5,6-dimethoxy-1-indole)acetate [I: $R_1$ is $C_2H_5$; $R_2$ is $CH_3$; $R_3$ is $C_6H_5CO$; $R_4$ is 5,6-$(CH_3O)_2$; Y is $CH_2$] was prepared by reacting 15 g. (0.051 mole) of 3-benzoyl-2-methyl-5,6-dimethoxyindole with 9.35 g. (0.056 mole) of ethyl bromoacetate in 120 ml. of dry dimethylformamide in the presence of 2.23 g. (0.056 mole) of a 61% suspension of sodium hydride in mineral oil using the procedure described above in Example 1(B). There was thus obtained ethyl α-(3-benzoyl-2-methyl-5,6-dimethoxy-1-indole)acetate as a pale yellow solid.

(C) α-(3-benzoyl-2-methyl-5,6-dimethoxy-1-indole) acetic acid [I: $R_1$ is H; $R_2$ is $CH_3$; $R_3$ is $C_6H_5CO$; $R_4$ is 5,6-$(CH_3O)_2$; Y is $CH_2$] was prepared by saponification of the ethyl α-(3-benzoyl-2-methyl-5,6-dimethoxy-1-indole)acetate described above in Example 15(B), in a solution containing 30 g. of potassium hydroxide in 200 ml. of ethanol using the procedure described above in Example 1(C). The crude product was recrystallized from ethanol and dried in vacuo at 100° C. to give 11.5 g. of α-(3-benzoyl-2-methyl-5,6-dimethoxy-1-indole)acetic acid, melts partially at 138–140° C., resolidifies and melts again at 189–190° V.

*Analysis.*—Calcd. for $C_{20}H_{19}NO_5$ (percent): C, 67.98; H, 5.58; N, 3.96. Found (percent): C, 66.23; H, 5.58; N, 3.76.

EXAMPLE 16

(A) Ethyl β-(3-benzoyl-2-methyl-5,6-dimethoxy-1-indole)-propionate [I: $R_1$ is $C_2H_5$; $R_2$ is $CH_3$; $R_3$ is $C_6H_5CO$; $R_4$ is 5,6-$(CH_3O)_2$; Y is $CH_2CH_2$] was prepared by reacting 16 g. (0.054 mole) of 3-benzoyl-2-methyl-5,6-dimethoxyindole with 10.3 g. (0.057 mole) of ethyl β-bromopropionate in 100 ml. of dry dimethylformamide in the presence of 2.36 g. (0.06 mole) of a 61% suspension of sodium hydride in mineral oil using the procedure described above in Example 1(B). There was thus obtained ethyl β-(3-benzoyl-2-methyl - 5,6 - dimethoxy-1-indole)-propionate as a light brown gum.

(B) β-(3-benzoyl - 2 - methyl - 5,6 - dimethoxy - 1-indole)propionic acid [I: $R_1$ is H; $R_2$ is $CH_3$; $R_3$ is $C_6H_5CO$; $R_4$ is 5,6-$(CH_3O)_2$; Y is $CH_2CH_2$] was prepared by saponification of the ethyl β-(3-benzoyl-2-methyl-5,6-dimethoxy - 1 - indole)propionate obtained above in Example 16(A) in a solution containing 30 g. of potassium hydroxide in 200 ml. of methanol using the procedure described above in Example 1(C). The crude product was recrystallized from ethanol to give 12.7 g. of β-(3 - benzoyl - 2 - methyl - 5,6 - dimethoxy - 1 - indole) propionic acid, M.P. 198–201° C.

*Analysis.*—Calcd. for $C_{21}H_{21}NO_5$ (percent): C, 68.65; H, 5.76; N, 3.81. Found (percent): C, 68.92; H, 5.87; N, 3.62.

EXAMPLE 17

(A) Ethyl β-[3 - (4 - methylbenzoyl) - 2 - methyl - 1-indole]propionate [I: $R_1$ is $C_2H_5$; $R_2$ is $CH_3$; $R_3$ is 4-$CH_3C_6H_4CO$; $R_4$ is H; Y is $CH_2CH_2$] was prepared by reaction of 32 g. (0.13 mole) of 3-(4-methylbenzoyl)-2-methylindole with 25.4 g. (0.14 mole) of ethyl β-bromopropionate in 250 ml. of dimethylformamide in the presence of 5.4 g. (0.14 mole) of a 62% suspension of sodium hydride in mineral oil using the procedure described above in Example 1(B). There was thus obtained ethyl β-[3 - (4 - methylbenzoyl) - 2 - methyl-1-indole]propionate as a yellow gum.

(B) β-[3 - (4 - methylbenzoyl) - 2 - methyl-1-indole] propionic acid [I: $R_1$ is H; $R_2$ is $CH_3$; $R_3$ is

4-$CH_3C_6H_4CO$ $R_4$ is H; Y is $CH_2CH_2$] was prepared by saponification of the ethyl β-[3 - (4-methylbenzoyl)-2-methyl-1-indole] propionate obtained above in Example 17(A) in a solution containing 30 g. of potassium hydroxide in 200 ml. of methanol using the manipulative procedure described above in Example 1(C). The crude product was recrystallized from ethanol giving 19 g. of β-[3-(4-methylbenzoyl)-2-methyl-1-indole]propionic acid, M.P. 210.5–213° C.

*Analysis.*—Calcd. for $C_{20}H_{19}NO_3$ (percent): C, 74.74; H, 5.96; N, 4.36. Found (percent): C, 74.57; H, 6.11; N, 4.00.

EXAMPLE 18

(A) 3-(4 - chlorobenzoyl) - 2 - methyl - 5,6 - dimethoxyindole [II: $R_2$ is $CH_3$; $R_3$ is 4-$ClC_6H_4CO$; $R_4$ is 5,6-$(CH_3O)_2$] was prepared by reacting 112 g. (0.64 mole) of 4-chlorobenzoyl chloride with the Grignard reagent prepared from 58 g. (0.30 mole) of 2-methyl-5,6-dimethoxyindole and 11 ml. (0.33 mole) of a 3 M ether solution of ethyl magnesium bromide in a total of 650 ml. of tetrahydrofuran using the procedure described above in Example 1(A). The crude product was recrystallized from ethanol to give 49 g. of 3-(4-chlorobenzoyl)-2-methyl-5,6-dimethoxyindole, M.P. 223.5–225.5° C.

*Analysis.*—Calcd. for $C_{18}H_{16}ClNO_3$ (percent): C, 65.55; H, 4.89; N, 4.25; Cl, 10.75. Found (percent): C, 65.69; H, 4.95; N, 4.00; Cl, 10.71.

(B) Ethyl α-[3 - (4 - chlorobenzoyl) - 2 - methyl-5,6-dimethoxy-1-indole]propionate [I: $R_1$ is $C_2H_5$; $R_2$ is $CH_3$; $R_3$ is 4-$ClC_6H_4CO$; $R_4$ is 5,6-$(CH_3O)_2$; Y is $CH_3CH$] was prepared by reacting 19.5 g. (0.059 mole) of 3-(4-chlorobenzoyl) - 2 - methyl-5,6-dimethoxyindole with 11.2 g. (0.062 mole) of ethyl α-bromopropionate in 100 ml. of dry dimethylformamide in the presence of 2.58 g. (0.065 mole) of a 61% suspension of sodium hydride in mineral oil using the procedure described above in Example 1(B). There was thus obtained ethyl α-[3-(4-chlorobenzoyl)-2-methyl-5,6-dimethoxy-1-indole]propionate.

(C) α-[3 - (4 - chlorobenzoyl) - 2 - methyl - 5,6 - dimethoxy - 1 - indole]propionic acid [I: $R_1$ is H; $R_2$ is $CH_3$; $R_3$ is 4-$ClC_6H_4CO$; $R_4$ is 5,6-$(CH_3O)_2$; Y is $CH_3CH$] was prepared by saponification of the ethyl α-[3 - (4 - chlorobenzoyl) - 2 - methyl - 5,6 - dimethoxy-1-indole]propionate obtained above in Example 18(B) in a solution containing 35 g. of potassium hydrxide in 250 ml. of methanol using the procedure described above in Example 1(C). The crude product was recrystallized once from ethanol and once from ethyl acetate to give 13.5 g. of α-[3 - (4 - chlorobenzoyl) - 2 - methyl-5,6-dimethoxy-1-indole]propionic acid, M.P. 174–176.5° C.

EXAMPLE 19

(A) Ethyl α-[3 - (4 - chlorobenzoyl) - 2 - methyl-5,6-dimethoxy-1-indole]acetate [I: $R_1$ is $C_2H_5$; $R_2$ is $CH_3$; $R_3$ is 4-$ClC_6H_4CO$; $R_4$ is 5,6-$(CH_3O)_2$; Y is $CH_2$] was prepared by reaction of 19.5 g. (0.059 mole) of 3-(4-chlorobenzoyl) - 2 - methyl - 5,6 - dimethoxyindole with 10.4 g. (0.062 mole) of ethyl bromoacetate in 100 ml. of dry dimethylformamide in the presence of 2.58 g. (0.065 mole) of a 61% suspension of sodium hydride in mineral oil using the procedure described above in Example 1(B). There was thus obtained ethyl α-[3-(4-chlorobenzoyl)-2-methyl-5,6-dimethoxy-1-indole]acetate as an off-white solid.

(B) α-[3 - (4 - chlorobenzoyl) - 2-methyl-5,6-dimethoxy-1-indole]acetic acid [I: $R_1$ is H; $R_2$ is $CH_3$; $R_3$ is 4-$ClC_6H_4CO$; $R_4$ is 5,6-$(CH_3O)_2$; Y is $CH_2$] was prepared by saponification of the ethyl α-[3-(4-chlorobenzoyl)-2-methyl-5,6-dimethoxy - 1 - indole]acetate obtained above in Example 19(A) in a solution of 30 g. of potassium hydroxide in 200 ml. of methanol using the procedure described above in Example 1(C). The product was recrystallized from ethanol to give 16 g. of α-[3-(4-chlorobenzoyl) - 2 - methyl - 5,6 - dimethoxy - 1 - indole]acetic acid as yellow needles, M.P. 157–159° C.

*Analysis.*—Calcd. for $C_{20}H_{18}ClNO_5$ (percent): C, 61.93; H, 4.68; N, 3.61; Cl, 9.14. Found (percent): C, 61.62; H, 4.53; N, 3.39; Cl, 9.02.

EXAMPLE 20

(A) 3-(2,6 - dimethoxybenzoyl) - 2-methylindole [II: $R_2$ is $CH_3$; $R_3$ is 2,6-$(CH_3O)_2C_6H_3CO$; $R_4$ is H] was prepared by reaction of 76 g. (0.38 mole) of 2,6-dimethoxybenzoyl chloride with the Grignard reagent prepared from 50 g. (0.138 mole) of 2-methylindole and 138 ml. (0.38 mole) of a 3 M ether solution of ethyl magnesium bromide in a total volume of about 500 ml. of diethyl ether and 100 ml. of tetrahydrofuran using the procedure described above in Example 1(A). The crude product was recrystallized once from ethyl acetate and once from ethanol to give 46.5 g. of 3-(2,6-dimethoxybenzoyl)-2-methylindole, M.P. 199–200° C.

*Analysis.*—Calcd. for $C_{18}H_{17}NO_3$ (percent): C, 73.20; H, 5.80; N, 4.74. Found (percent): C, 73.14; H, 5.84; N, 4.45.

(B) Ethyl α-[3 - (2,6 - dimethoxybenzoyl) - 2-methyl-1-indole]acetate [I: $R_1$ is $C_2H_5$; $R_2$ is $CH_3$; $R_3$ is 2,6-$(CH_3O)_2C_6H_3CO$; $R_4$ is H; Y is $CH_2$] was prepared by reaction of 20 g. (0.068 mole) of 3-(2,6-dimethoxybenzoyl)-2-methylindole with 11.3 g. (0.068 mole) of ethyl bromoacetate in 150 ml. of dry dimethylformamide in the presence of 3 g. (0.068 mole) of a 54% suspension of sodium hydride in mineral oil using the procedure described above in Example 1(B). There was thus obtained ethyl α-[3 - (2,6 - dimethoxybenzoyl) - 2 - methyl-1-indole]acetate.

(C) α-[3 - (2,6 - dimethoxybenzoyl) - 2 - methyl-1-indole]acetic acid ethanolate [I: $R_1$ is H; $R_2$ is $CH_3$; $R_3$ is 2,6 - $(CH_3O)_2C_6H_3CO$; $R_4$ is H; Y is $CH_2$] was prepared by saponification of the ethyl α-[3-(2,6-dimethoxybenzoyl)-2-methyl-1-indole]acetate obtained above in Example 20(B) in a solution containing 60 g. of potassium hydroxide in 450 ml. of methanol using the procedure described above in Example 1(C). The crude product was recrystallized from ethanol to give 18 g. of α-[3-(2,6-dimethoxybenzoyl)-2-methyl-1-indole]acetic acid ethanolate as a white crystalline solid, M.P. 250° C. (dec.).

*Analysis.*—Calcd. for $C_{20}H_{19}NO_5 \cdot C_2H_6O$ (percent): C, 66.15; H, 6.31; N, 3.51. Found (percent): C, 66.39; H, 6.22; N, 3.28.

EXAMPLE 21

(A) Ethyl β-[3-(2,6-dimethoxybenzoyl)-2-methyl-1-indole]propionate [I: $R_1$ is $C_2H_5$; $R_2$ is $CH_3$; $R_3$ is 2,6-$(CH_3O)_2C_6H_3CO$; $R_4$ is H; Y is $CH_2CH_2$] was prepared by reaction of 18 g. (0.06 mole) of 3-(2,6-dimethoxybenzoyl)-2-methylindole with 12.1 g. (0.067 mole) of ethyl B-bromopropionate in 150 ml. of dimethylformamide in the presence of 2.3 g. (0.061 mole) of a 62% suspension of sodium hydride in mineral oil using the procedure described above in Example 1(B). There was thus obtained 20 g. of ethyl β-[3-(2,6-dimethoxybenzoyl)-2-methyl-1-indole]propionate as an off-white solid.

(B) β - [3 - (2,6 - dimethoxybenzoyl) - 2 - methyl-1-indole]propionic acid [I: $R_1$ is H; $R_2$ is $CH_3$; $R_3$ is 2,6-$(CH_3O)_2C_6H_3CO$; $R_4$ is H; Y is $CH_2CH_2$] was prepared by saponification of 20 g. (0.051 mole) of ethyl β-[3-(2,6-dimethoxybenzoyl)-2-methyl-1-indole]propionate in a solution containing 75 g. of potassium hydroxide in 500 ml. of methanol using the procedure described above in Example 1(C). The crude product was recrystallized from ethanol to give 9 g. of β[3-(2,6-dimethoxybenzoyl)-2-methyl-1-indole]propionic acid as an off-white solid, M.P. 195–197.5° C.

*Analysis.*—Calcd. for $C_{21}H_{21}NO_5$ (percent): C, 68.65; H, 5.76; N, 3.81. Found (percent): C, 68.54; H, 5.85; N, 3.63.

EXAMPLE 22

(A) 3-(4-nitrobenzoyl)-2-methylindole [II: $R_2$ is $CH_3$; $R_3$ is $4\text{-}NO_2C_6H_4CO$; $R_4$ is H] was prepared by reacting 71 g. (0.38 mole) of 4-nitrobenzoyl chloride with the Grignard reagent prepared from 50 g. (0.38 mole) of 2-methylindole and 138 ml. (0.41 mole) of a 3 M ether solution of ethyl magnesium bromide in a total of 400 ml. of absolute ether using the procedure described above in Example 1(A). The crude product was recrystallized from ethanol to give 96 g. of 3-(4-nitrobenzoyl)-2-methylindole, M.P. 230° C.

*Analysis.*—Calcd. for $C_{16}H_{12}N_2O_3$ (percent): C, 68.56; H, 4.32; N, 10.00. Found (percent): C, 68.82; H, 4.46; N, 10.09.

(B) α-[3-(4-nitrobenzoyl) - 2 - methyl-1-indole]acetic acid [I: $R_1$ is H; $R_2$ is $CH_3$; $R_3$ is $4\text{-}NO_2C_6H_4CO$; $R_4$ is H; Y is $CH_2$] was prepared by reacting 7.5 g. (0.027 mole) of 3-(4-nitrobenzoyl)-2-methylindole with 4.5 g. (0.025 mole) of ethyl bromoacetate in 70 ml. of dimethylformamide in the presence of 1.05 g. (0.027 mole) of a 60% suspension of sodium hydride in mineral oil using the procedure described above in Example 1(B), and saponificaton of the resulting ethyl α-[3-(4-nitrobenzoyl)-2-methyl-1-indole]acetate in a solution containing 20 g. of potassium hydroxide in 200 ml. of methanol using the procedure described above in Example 1(C). The crude product was recrystallized from acetonitrile to give α-[3-(4-nitrobenzoyl)-2-methyl-1-indole]acetic acid as a yellow solid.

EXAMPLE 23

(A) 3-benzoyl-2-methyl-5-methoxyindole [II: $R_2$ is $CH_3$; $R_3$ is $C_6H_5CO$; $R_4$ is 5-$CH_3O$] was prepared by reaction of 61 g. (0.43 mole) of benzoyl chloride with the Grignard reagent prepared from 35 g. (0.22 mole) of 2-methyl-5-methoxyindole and 80 ml. (0.24 mole) of a 3 M ether solution of ethyl magnesium bromide in a total volume of about 430 ml. of tetrahydrofuran using the procedure described above in Example 1(A). The crude product was recrystallized from ethanol to give 26.5 g. of 3-benzoyl-2-methyl-5-methoxyindole, M.P. 196–198° C.

*Analysis.*—Calcd. for $C_{17}H_{15}NO_2$ (percent): C, 76.96; H, 5.70; N, 5.28. Found (percent): C, 77.21; H, 5.66; N, 5.01.

(B) Ethyl α-(3-benzoyl-2-methyl-5-methoxy-1-indole)acetate [I: $R_1$ is $C_2H_5$; $R_2$ is $CH_3$; $R_3$ is $C_6H_5CO$; $R_4$ is 5-$CH_3O$; Y is $CH_2$] was prepared by reaction of 6.6 g. (0.04 mole) of ethyl bromoacetate with 10 g. (0.04 mole) of 3-benzoyl-2-methyl-5-methoxyindole in 100 ml. of anhydrous dimethylformamide in the presence of 1.65 g. (0.042 mole) of a 61% suspension of sodium hydride in mineral oil using the procedure described above in Example 1(B). There was thus obtained ethyl α-(3-benzoyl-2-methyl-5-methoxy-1-indole)acetate as a yellow gum.

(C) α - (3-benzoyl-2-methyl-5-methoxy-1-indole)acetic acid [I: $R_1$ is H; $R_2$ is $CH_3$; $R_3$ is $C_6H_5CO$; $R_4$ is 5-$CH_3O$; Y is $CH_2$] was prepared by saponification of the ethyl α-(3-benzoyl-2-methyl-5-methoxy - 1 - indole)acetate obtained above in Example 23(B) in a solution of ethanol and aqueous sodium hydroxide using the procedure described above in Example 1(C). The crude product was recrystallized from ethyl acetate to give 6.3 g. of α-(3-benzoyl-2-methyl-5-methoxy-1-indole)acetic acid, M.P. 202.5–205° C.

*Analysis.*—Calcd. for $C_{19}H_{17}NO_4$ (percent): C, 70.57; H, 5.30; N, 4.33. Found (percent): C, 70.87; H, 5.33; N, 4.03.

EXAMPLE 24

(A) Ethyl β-(3-benzoyl-2-methyl-5-methoxy-1-indole)propionate [I: $R_1$ is $C_2H_5$; $R_2$ is $CH_3$; $R_3$ is $C_6H_5CO$; $R_4$ is 5-$CH_3O$; Y is $CH_2CH_2$] was prepared by reaction of 7.16 g. (0.04 mole) of ethyl β-bromopropionate with 10 g. (0.04 mole) of 3-benzoyl-2-methyl-5-methoxyindole in 100 ml. of dry dimethylformamide in the presence of 1.65 g. (0.042 mole) of a 61% suspension of sodium hydride in mineral oil using the procedure described above in Example 1(B). There was thus obtained ethyl β-(3-benzoyl-2-methyl-5-methoxy - 1 - indole)-propionate as a light brown gum.

(B) β - (3-benzoyl-2-methyl-5-methoxy-1-indole)propionic acid [I: $R_1$ is H; $R_2$ is $CH_3$; $R_3$ is $C_6H_5CO$; $R_4$ is 5-$CH_3O$; Y is $CH_2CH_2$] was prepared by saponification of the ethyl β-(3-benzoyl-2-methyl-5-methoxy-1-indole)propionate obtained above in Example 24(A) in a solution containing 15 g. of potassium hydroxide in 100 ml. of methanol using the procedure described above in Example 1(C). The crude product was recrystallized from ethanol to give 8.6 g. of β-(3-benzoyl-2-methyl-5-methoxy-1-indole)propionic acid, M.P. 215–218.5° C.

*Analysis.*—Calcd. for $C_{20}H_{19}NO_4$ (percent): C, 71.20; H, 5:68; N, 4.15. Found (percent): C, 71.47; H, 5.76; N, 3.73.

EXAMPLE 25

(A) 3-(4-chlorobenzoyl)-2-methyl-5 - methoxyindole [II: $R_2$ is $CH_3$; $R_3$ is $4\text{-}ClC_6H_4CO$; $R_4$ is 5-$CH_3O$] was prepared by reaction of 32.4 g. (0.18 mole) of 4-chlorobenzoyl chloride with the Grignard reagent prepared from 15 g. (0.093 mole) of 2-methyl-5-methoxyindole and 35 ml. (0.11 mole) of a 3 M ether solution of ethyl magnesium bromide in a total volume of 200 ml. of dry ether and 150 ml. of tetrahydrofuran using the procedure described above in Example 1(A). The crude product was dissolved in 200 ml. of 15% methanolic potassium hydroxide, and diluted to the cloud point with water. The crude product, which separated on cooling, was collected, washed with methanol/water and recrystallized from methanol to give 12 g. of 3-(4-chlorobenzoyl)-2-methyl-5-methoxyindole, M.P. 189–190.5° C.

(B) β-[3-(4-chlorobenzoyl)-2-methyl-5-methoxy - 1-indole]propionic acid [I: $R_1$ is H; $R_2$ is $CH_3$; $R_3$ is 4-$ClC_6H_4CO$; $R_4$ is 5-$CH_3O$; Y is $CH_2CH_2$] was prepared by reaction of 4.95 g. (0.035 mole) of ethyl β-bromopropionate with 10.5 g. (0.035 mole) of 3-(4-chlorobenzoyl)-2-methyl-5-methoxyindole in 150 ml. of anhydrous dimethylformamide in the presence of 1.5 g. (0.038 mole) of a 60% suspension of sodium hydride in mineral oil using the procedure described above in Example 1(B), and saponification of the resulting ethyl β-[3-(4-chlorobenzoyl)-2-methyl-5-methoxy-1 - indole]propionate in a solution of 20 g. of potassium hydroxide in 200 ml. of methanol using the procedure described above in Example 1(C). The crude product was recrystallized two times from acetonitrile to give 8.9 g. of β-[3-(4-chlorobenzoyl)-2-methyl-5-methoxy-1-indole]propionic acid, M.P. 204–205° C.

*Analysis.*—Calcd. for $C_{20}H_{18}ClNO_4$ (percent): C, 64.60; H, 4.88; N, 3.77. Found (percent): C, 64.78; H, 4.81; N, 3.60.

EXAMPLE 26

α-(3-benzoyl-2-methyl-1-indole)propionic acid [I: $R_1$ is H; $R_2$ is $CH_3$; $R_3$ is $C_6H_5CO$; $R_4$ is H; Y is $CH_3CH$] was prepared by reaction of 23.5 g. (0.1 mole) of 3-benzoyl-2-methylindole with 18.1 g. (0.1 mole) of ethyl α-bromopropionate in 200 ml. of dry dimethylformamide in the presence of 3.94 g. (0.1 mole) of a 61% suspension of sodium hydride in mineral oil using the procedure described above in Example 1(B), and saponification of the resulting ethyl α-(3-benzoyl-2-methyl-1-indole)propionate in a solution of 50 g. of potassium hydroxide in 500 ml. of methanol using the procedure described above in Example 1(C). The crude product was recrystallized from absolute ethanol to give 8.5 g. of α-(3-benzoyl-2-methyl-1-indole)propionic acid, M.P. 225–227° C.

*Analysis.*—Calcd. for $C_{19}H_{17}NO_3$ (percent): C, 74.25; H, 5.58; N, 4.56. Found (percent): C, 74.16; H, 5.58; N, 4.30.

EXAMPLE 27

α-[3-(4-chlorobenzoyl)-2-methyl - 1 - indole]propionic acid [I: $R_1$ is H; $R_2$ is $CH_3$; $R_3$ is $4-ClC_6H_4CO$; $R_4$ is H; Y is $CH_3CH$] was prepared by reaction of 20 g. (0.074 mole) of 3-(4-chlorobenzoyl)-2-methylindole with 13.3 g. (0.074 mole) of ethyl α-bromopropionate in 200 ml. of dimethylformamide in the presence of 3.0 g. (0.075 mole) of a 61% suspension of sodium hydride in mineral oil using the procedure described above in Example 1(B), and saponification of the resulting ethyl α-[3-(4-chlorobenzoyl)-2-methyl-1-indole]propionate in a solution of 50 g. of potassium hydroxide in 400 ml. of methanol using the procedure described above in Example 1(C). The crude product was recrystallized from ethanol/water to give α-[3-(4-chlorobenzoyl)-2-methyl-1 - indole]propionic acid, M.P. 116° C.

*Analysis.*—Calcd. for $C_{19}H_{16}ClNO_3$ (percent): C, 66.76; H, 4.72; N, 4.10; Cl, 10.37. Found (percent): C, 66.93; H, 5.08; N, 3.78; Cl, 10.51.

EXAMPLE 28

β - [3-(4-methoxybenzoyl)-2-methyl-1-indole]propionic acid [I: $R_1$ is H; $R_2$ is $CH_3$; $R_3$ is $4-CH_3OC_6H_4CO$; $R_4$ is H; Y is $CH_2CH_2$] was prepared by reaction of 16 g. (0.06 mole) of 3-(4-methoxybenzoyl)-2-methylindole with 11.5 g. (0.06 mole) of ethyl β-bromopropionate in 150 ml. of dimethylformamide in the presence of 2.5 g. (0.063 mole) of a 60% suspension of sodium hydride in mineral oil using the procedure described above in Example 1(B), and saponification of the resulting ethyl β-[3-(4-methoxybenzoyl)-2-methyl-1-indole]propionate with methanolic potassium hydroxide using the procedure described above in Example 1(C). The crude product was recrystallized once from ethyl acetate and once from acetonitrile to give 10.3 g. of β-[3-(4-methoxybenzoyl)-2-methyl-1-indole]propionic acid, M.P. 177–178.5° C.

*Analysis.*—Calcd. for $C_{20}H_{19}NO_4$ (percent): C, 17.20; H, 5.68; N, 4.15. Found (percent): C, 71.39; H, 5.66; N, 4.08.

EXAMPLE 29

(A) Ethyl β-[3-(4-chlorobenzoyl)-2-methyl-5,6 - dimethoxy-1-indole]propionate [I: $R_1$ is $C_2H_5$; $R_2$ is $CH_3$; $R_3$ is $4-ClC_6H_4CO$; $R_4$ is $5,6-(CH_3O)_2$; Y is $CH_2CH_2$] was prepared by reaction of 5.5 g. (0.03 mole) of ethyl β-bromopropionate with 9.5 g. (0.03 mole) of 3-(4-chlorobenzoyl)-2-methyl-5,6-dimethoxyindole in 100 ml. of dimethylformamide in the presence of 1.25 g. (0.03 mole) of a 61% suspension of sodium hydride in mineral oil using the procedure described above in Example 1(B). There was thus obtained ethyl β-[3-(4-chlorobenzoyl)-2-methyl-5,6-dimethoxy-1-indole]propionate as a cream colored gum.

(B) β - [3-(4-chlorobenzoyl)-2-methyl-5,6-dimethoxy-1-indole]propionic acid [I: $R_1$ is H; $R_2$ is $CH_3$; $R_3$ is $4-ClC_6H_4CO$; $R_4$ is $5,6-(CH_3O)_2$; Y is $CH_2CH_2$] was prepared by saponification of the ethyl β-[3-(4-chlorobenzoyl)-2-methyl-5,6-dimethoxy - 1 - indole]propionate obtained above in Example 29(A) in a solution of potassium hydroxide in ethanol using the procedure described above in Example 1(C). The crude product was recrystallized from ethyl acetate to give 5.1 g. of β-[3-(4-chlorobenzoyl)-2-methyl-5,6-dimethoxy-1-indole]propionic acid, M.P. 193.5–195.5° C.

*Analysis.*—Calcd. for $C_{21}H_{20}ClNO_5$ (percent): C, 62.76; H, 5.01; N, 3.48; Cl, 8.82. Found (percent): C, 62.57; H, 5.22; N, 3.22; Cl, 8.55.

EXAMPLE 30

(A) 3-(4-chlorobenzoyl)-2-methyl-5-fluoroindole [II: $R_2$ is $CH_3$; $R_3$ is $4-ClC_6H_4CO$; $R_4$ is 5-F] was prepared by reaction of 25 g. (0.14 mole) of 4-chlorobenzoyl chloride with the Grignard reagent prepared from 12 g. (0.08 mole) of 2-methyl-5-fluoroindole and 30 ml. (0.09 mole) of a 3 M ether solution of ethyl magnesium bromide in a total of about 100 ml. of tetrahydrofuran using the procedure described above in Example 1(A). There was thus obtained 8 g. of 3-(4-chlorobenzoyl)-2-methyl-5-fluoroindole, M.P. 231–233° C.

(B) α-[3-(4-chlorobenzoyl)-2-methyl-5-fluoro-1-indole] acetic acid [I: $R_1$ is H; $R_2$ is $CH_3$; $R_3$ is $4-ClC_6H_4CO$; $R_4$ is 5-F; Y is $CH_2$] was prepared by reaction of 2.4 g. (0.014 mole) of ethyl bromoacetate with 4 g. (0.015 mole) of 3-(4-chlorobenzoyl)-2-methyl-5-fluoroindole in 40 ml. of dimethylformamide in the presence of 0.6 g. (0.015 mole) of a 60% suspension of sodium hydride in mineral oil, and saponification of the resulting ethyl α-[3-(4 - chlorobenzoyl)-2-methyl-5-fluoroindole]acetate in a solution containing 10 g. of potassium hydroxide in 100 ml. of methanol all according to the procedure described above in Example 1(B) and (C). There was thus obtained 4.8 g. of α-[3-(4-chlorobenzoyl)-2-methyl-5-fluoro-1-indole]acetic acid.

EXAMPLE 31

β - [3 - (4 - chlorobenzoyl)-2-methyl-5-fluoro-1-indole] propionic acid [I: $R_1$ is H; $R_2$ is $CH_3$; $R_3$ is $4-ClC_6H_4CO$; $R_4$ is 5-F; Y is $CH_2CH_2$] was prepared by reaction of 2.5 g. (0.014 mole) of ethyl β-bromopropionate with 3.8 g. (0.14 mole) of 3-(4-chlorobenzoyl)-2-methyl-5-fluoroindole in 35 ml. of dimethylformamide in the presence of 0.58 g. (0.15 mole) of a 60% suspension of sodium hydride in mineral oil, and saponification of the resulting ethyl β - [3-(4-chlorobenzoyl)-2-methyl-5-fluoro-1-indole] propionate in a solution containing 12 g. of potassium hydroxide in 100 ml. of methanol all according to the procedure described above in Example 1(B) and (C). The crude product was recrystallized two times from acetonitrile to give 3.3 g. of β-[3-(4-chlorobenzoyl)-2-methyl - 5 - fluoro - 1 - indole]propionic acid, M.P. 205–207° C.

EXAMPLE 32

(A) 3-benzoyl-2-methyl-5-fluoroindole [II: $R_2$ is $CH_3$; $R_3$ is $C_6H_5CO$; $R_4$ is 5-F] was prepared by reaction of 22.5 g. (0.16 mole) of benzoyl chloride with the Grignard reagent prepared from 12 g. (0.08 mole) of 2-methyl-5-fluoroindole and 30 ml. (0.09 mole) of a 3 M ether solution of ethyl magnesium bromide in a total volume of about 100 ml. of tetrahydrofuran using the procedure described above in Example 1 (A). The crude product was recrystallized from methanol to give 8.6 g. of 3-benzoyl-2-methyl-5-fluoroindole, M.P. 232–234° C.

(B) α-(3-benzoyl-2-methyl-5-fluoro-1-indole)acetic acid [I: $R_1$ H; $R_2$ is $CH_3$; $R_3$ is $C_6H_5CO$; $R_4$ is 5-F; Y is $CH_2$] was prepared by reacting 2.9 g. (0.017 mole) of ethyl bromoacetate with 4 g. (0.017 mole) of 3-benzoyl-2-methyl-5-fluoroindole in 40 ml. of dimethylformamide in the presence of 0.68 g. (0.017 mole) of a 60% suspension of sodium hydride in mineral oil, and saponification of the resulting ethyl α-(3-benzoyl-2-methyl-5-fluoro-1-indole)acetate in a solution containing 10 g. of potassium hydroxide in 100 ml. of methanol all according to the procedure described above in Example 1(B) and (C). The crude product was recrystallized two times from acetonitrile to give 2.2 g. of α-(3-benzoyl-2-methyl-5-fluoro-1-indole)acetic acid, M.P. 253–255° C.

EXAMPLE 33

β-(3-benzoyl-2-methyl-5-fluoro-1-indole)propionic acid [I: $R_1$ is H; $R_2$ is $CH_3$; $R_3$ is $C_6H_5CO$; $R_4$ is 5-F; Y is $CH_2CH_2$] was prepared by reaction of 3.05 g. (0.017 mole) of ethyl β-bromopropionate with 4.0 g. (0.17 mole) of 3-benzoyl-2-methyl-5-fluoroindole in 35 ml. of dimethylformamide in the presence of 0.68 g. (0.018 mole) of a 60% suspension of sodium hydride in mineral oil, and saponification of the resulting ethyl β-(3-benzoyl-2-methyl-5-fluoro-1-indole)propionate in a solution containing 12 g. of potassium hydroxide in 100 ml. of methanol all according to the procedure described above in Example 1(B) and (C). The crude product was recrystallized two times from acetonitrile to give 3.4 g. of β-(3-benzoyl-2-methyl-5-fluoro-1-indole)propionic acid, M.P. 228–230° C.

EXAMPLE 34

(A) 3-(2,6-dichlorobenzoyl)-2-methylindole [II: $R_2$ is $CH_3$; $R_3$ is 2,6-$Cl_2C_6H_3CO$; $R_4$ is H] was prepared by reaction of 105 g. (0.5 mole) of 2,6-dichlorobenzoyl chloride with the Grignard reagent prepared from 65.6 g. (0.5 mole) of 2-methylindole and 180 ml. (0.54 mole) of a 3 M ether solution of ethyl magnesium bromide in a total volume of about 600 ml. of absolute diethyl ether and 100 ml. of tetrahydrofuran using the procedure described above in Example 1(A). The crude product was recrystallized from ethanol to give 50 g. of 3-(2,6-dichlorobenzoyl)-2-methylindole, M.P. 131–133° C.

(B) α-[3-(2,6-dichlorobenzoyl-2-methyl-1-indole]acetic acid [$R_1$ is H; $R_2$ is $CH_3$; $R_3$ is 2,6-$Cl_2C_6H_3CO$; $R_4$ is H; Y is $CH_2$] was prepared by reaction of 9.8 g. (0.057 mole) of ethyl bromoacetate with 17 g. (0.056 mole) of 3-(2,6-dichlorobenzoyl)-2-methylindole in 150 ml. of dimethylformamide in the presence of 2.2 g. (0.054 mole) of a 60% suspension of sodium hydride in mineral oil, and saponification of the resulting ethyl α-[3-(2,6-dichlorobenzoyl)-2-methyl-1-indole]acetate in a solution of 30 g. of potassium hydroxide in 400 ml. of hot methanol all according to the procedure described above in Example 1(B) and (C). The crude product was recrystallized from an ethyl acetate/cyclohexane mixture giving 8.9 of α-[3-(2,6-dichlorobenzoyl)-2-methyl-1-indole]acetic acid, M.P. 242–243° C.

EXAMPLE 35

β-[3-(2,6-dichlorobenzoyl)-2-methyl-1-indole]propionic acid [I: $R_1$ is H; $R_2$ is $CH_3$; $R_3$ is 2,6-$Cl_2C_6H_3CO$; $R_4$ is H; Y is $CH_2CH_2$] was prepared by reaction of 10.1 g. (0.056 mole) of ethyl β-bromopropionate with 17 g. (0.56 mole) of 3-(2,6-dichlorobenzoyl)-2-methylindole in 150 ml. of anhydrous dimethylformamide in the presence of 2.2 g. (0.055 mole) of a 60% suspension of sodium hydride in mineral oil, and saponification of the resulting ethyl β-[3-(2,6-dichlorobenzoyl)-2-methyl-1-indole]propionate in a solution containing 30 g. of potassium hydroxide in 350 ml. of methanol all according to the procedure described above in Example 1(B) and C. The crude product was recrystallized from an ethyl acetate/cyclohexane mixture to give 12 g. of β-[3-(2,6-dichlorobenzoyl)-2-methyl-1-indole]propionic acid, M.P. 194–196° C.

EXAMPLE 36

β-(3-benzoyl-2-methyl-1-indole)-α-methylpropionic acid [I: $R_1$ is H; $R_2$ is $CH_3$; $R_3$ is $C_6H_5CO$; $R_4$ is H; Y is $CH_2CH(CH_3)$] was prepared by reaction of 8.4 g. (0.043 mole) of ethyl α-bromoisobutyrate with 10 g. (0.043 mole) of 3-benzoyl-2-methylindole in 100 ml. of anhydrous dimethylformamide in the presence of 1.7 g. (0.043 mole) of a 60% suspension of sodium hydride in mineral oil, and saponification of the resulting ethyl β-(3-benzoyl-2-methyl-1-indole)-α-methyl-propionate in a solution containing 30 g. of potassium hydroxide in 300 ml. of methanol all according to the procedure described above in Example 1(B) and (C). The product was recrystallized once from isopropanol and once from ethyl acetate to give 3.5 g. of β-(3-benzoyl-2-methyl-1-indole)-α-methylpropionic acid, M.P. 194–196° C.

*Analysis.*—Calcd. for $C_{20}H_{19}NO_3$ (percent): C, 74.74; H, 5.96; N, 4.36. Found (percent): C, 75.03; H, 5.94; N, 4.05.

EXAMPLE 37

(A) 3-(2-thenoyl)-2-methylindole [II: $R_2$ is $CH_3$; $R_3$ is 2-$C_4H_3$S-CO; $R_4$ is H] was prepared by reaction of 57 g. (0.38 mole) of thiophene-2-carboxylic acid chloride with the Grignard reagent prepared from 50 g. (0.038 mole) of 2-methylindole and 138 ml. (0.41 mole) of a 3 M ether solution of ethyl magnesium bromide in a total of 600 ml. of absolute diethyl ether using the procedure described above in Example 1(A). The crude product was recrystallized from ethanol to give 37 g. of 3-(2-thenoyl)-2-methylindole.

(B) α-[3-(2-thenoyl)-2-methyl-1-indole]acetic acid [I: $R_1$ is H; $R_2$ is $CH_3$; $R_3$ is 2-$C_4H_3$S-CO; $R_4$ is H; Y is $CH_2$] was prepared by reaction of 6.7 g. (0.04 mole) of ethyl bromoacetate with 10 g. (0.04 mole) of 3-(2-thenoyl)-2-methylindole in 100 ml. of anhydrous dimethylformamide in the presence of 1.65 g. of (0.04 mole) of a 60% suspension of sodium hydride in mineral oil, and saponification of the resulting ethyl α-[3-(2-thenoyl)-2-methyl-1-indole]-acetate in a solution of potassium hydroxide in methanol all according to the procedure described above in Example 1(B) and (C).

EXAMPLE 38

α-[3-(2-thenoyl)-2-methyl-1-indole]propionic acid [I: $R_1$ is H; $R_2$ is $CH_3$; $R_3$ is 2-$C_4H_3$S-CO; $R_4$ is H; Y is $CH_3CH$] was prepared by reaction of 7.5 g. (0.04 mole) ethyl α-bromopropionate with 10 g. (0.04 mole) of 3-(2-thenoyl)-2-methylindole in 100 ml. of dry dimethylformamide in the presence of 1.65 g. (0.04 mole) of a 60% suspension of sodium hydride in mineral oil, and saponification of the resulting ethyl α-[3-(2-thenoyl)-2-methyl-1-indole]propionate in a solution containing potassium hydroxide in methanol all according to the procedure described above in Example 1(B) and (C).

EXAMPLE 39

β-[3-(2-thenoyl)-2-methyl-1-indole]propionic acid [I: $R_1$ is H; $R_2$ is $CH_3$; $R_3$ is 2-$C_4H_3$S-CO; $R_4$ is H; Y is $CH_2CH_2$] was prepared by reaction of 7.5 g. (0.42 mole) of ethyl β-bromopropionate with 10 g. (0.042 mole) of 3-(2-thenoyl)-2-methylindole in 100 ml. of dry dimethylformamide in the presence of 1.75 g. (0.045 mole) of a 61% suspension of sodium hydride in mineral oil, and saponification of the resulting ethyl β-[3-(2-thenoyl)-2-methyl-1-indole]propionate in a solution containing potassium hydroxide in methanol all according to the procedure described above in Example 1(B) and (C).

EXAMPLE 40

Ethyl α-[3-(4-nitrobenzoyl)-2-methyl-1-indole]acetate [I: $R_1$ is $C_2H_5$; $R_2$ is $CH_3$; $R_3$ is 4-$NO_2C_6H_4CO$; $R_4$ is H; Y is $CH_2$] was prepared by reaction of 28.5 g. (0.17 mole)

of ethyl bromoacetate with 45.5 g. (0.16 mole) of 3-(4-nitrobenzoyl)-2-methylindole in 300 ml. of dry dimethylformamide in the presence of 7.05 g. (0.18 mole) of a 61% suspension of sodium hydride in mineral oil using the procedure described above in Example 1(B). The crude product was recrystallized from methanol to give 36 g. of ethyl α-[3-(4-nitrobenzoyl)-2-methyl-1-indol]-acetate, M.P. 155–158° C.

EXAMPLE 41

(A) Ethyl α - [3-(4-aminobenzoyl)-2-methyl-1-indole] acetate [I: $R_1$ is $C_2H_5$; $R_2$ is $CH_3$; $R_3$ is 4-$NH_2C_6H_4CO$; $R_4$ is H; Y is $CH_2$].—Ten grams (0.027 mole) of ethyl α-[3-(4-nitrobenzoyl)-2-methyl-1 - indole]acetate were dissolved in 200 ml. of ethyl acetate and 50 ml. of methanol and reduced with hydrogen at room temperature in a Parr shaker over 1 g. of a 10% palladium-on-charcoal catalyst using an initial hydrogen pressure of about 50 pounds p.s.i. When reduction was complete, the catalyst was removed by filtration, the filtrate taken to dryness, and the residue recrystallized from a chloroform/hexane mixture giving 10 g. of ethyl α-[3-(4-aminobenzoyl)-2-methyl-1-indole]acetate, M.P. 85–88.5° C.

(B) α - [3-(4-aminobenzoyl)-2-methyl-1-indole]acetic acid [I: $R_1$ is H; $R_2$ is $CH_3$; $R_3$ is 4-$NH_2C_6H_4CO$; $R_4$ is H; Y is $CH_2$] is prepared by saponification of the ethyl α - [3 - (4-aminobenzoyl)-2-methyl-1-indole]acetate obtained above in Example 41(A) in ethanolic sodium hydroxide using the procedure described above in Example 1(C).

EXAMPLE 42

(A) 3-benzoyl-2-t-butylindole [II: $R_2$ is $(CH_3)_3C$; $R_3$ is $C_6H_5CO$; $R_4$ is H].—A mixture of 54 g. (0.5 mole) of phenylhydrazine and 50 g. (0.5 mole) of pinacolone in 300 ml. of benzene was refluxed for seven hours under a Dean-Stark trap, during which time 6 ml. of water was collected. The resulting solution was taken to dryness in vacuo, and the resulting light brown liquid was heated slowly to 100° C, with 400 g. (2.93 moles) of anhydrous zinc chloride. The heating bath was then removed, and the temperature of the reaction mixture rose rapidly to 150° C. The mixture was cooled in a water bath to 130° C. and then heated for twenty minutes at 190° C. After cooling, the mixture was mixed with water and ethyl acetate, the organic phase was separated, washed once with dilute acid, once with dilute sodium bicarbonate, and once with saturated brine. After drying the organic solution over anhydrous sodium sulfate, the solution was taken to dryness, and the residual brown oil was distilled in vacuo, the product being collected at 85–95° C./0.05 mm. There was thus obtained 46 g. of 2-t-butylindole as a colorless solid, M.P. 65–69° C.

Reaction of 31 g. (0.22 mole) of benzoyl chloride with the Grignard reagent prepared from 19 g. (0.11 mole) of the 2-t-butylindole prepared above and 40 ml. (0.12 mole) of a 3 M ether solution of ethyl magnesium bromide in a total of 210 ml. of tetrahydrofuran using the procedure described above in Example 1(A), and recrystallization of the crude product from ethanol gave 3-benzoyl-2-t-butylindole, M.P. 215–220° C.

(B) α - (3-benzoyl-2-t-butyl-1-indole)acetic acid [I: $R_1$ is H; $R_2$ is $(CH_3)_3C$; $R_3$ is $C_6H_5CO$; $R_4$ is H; Y is $CH_2$] is prepared by reaction of the 3-benzoyl-2-t-butylindole obtained above in Example 42(A) with ethyl bromoacetate in dimethylformamide in the presence of sodium hydride, and saponification of the resulting ethyl α-(3-benzoyl-2-t-butyl-1-indole)acetate all according to the procedure described above in Example 1(B) and (C).

EXAMPLE 43

β-(3-benzoyl-2-t-butyl-1-indole)propionic acid [I: $R_1$ is H; $R_2$ is $(CH_3)_3C$; $R_3$ is $C_6H_5CO$; $R_4$ is H; Y is $CH_2CH_2$] is perpared by reaction of 3-benzoyl-2-t-butylindole with ethyl β-bromopropionate in dimethylformamide in the presence of sodium hydride, and saponification of the resulting ethyl β - (3 - benzoyl-2-t-butyl-1-indole)propionate all according to the procedure described in Example 1(B) and (C).

EXAMPLE 44

(A) 3-(4-chlorobenzoyl)-2-t-butylindole [II: $R_2$ is $(CH_3)_3C$; $R_3$ is 4-$ClC_6H_4CO$; $R_4$ is H] is preared by reaction, in anhydrous ether or tetrahydrofuran, of 4-chlorobenzoyl chloride with the Grignard reagent prepared from 2-t-butylindole and methylmagnesium bromide using the procedure described above in Example 1(A).

(B) α - [3-(4-chlorobenzoyl)-2-t-butyl-1-indole]acetic acid [I: $R_1$ is H; $R_2$ is $(CH_3)_3C$; $R_3$ is 4-$ClC_6H_4CO$; $R_4$ is H; Y is $CH_2$] is prepared by reaction of ethyl bromoacetate with 3-(4-chlorobenzoyl)-2-t-butylindole in dry dimethylformamide in the presence of sodium hydride, and saponification of the resulting ethyl α-[3-(4-chlorobenzoyl)-2-t-butyl-1-indole]acetate all according to the procedure described above in Example 1(B) and (C).

EXAMPLE 45

β - [3 - (4-chlorobenzoyl)-2-t-butyl-1-indole]propionic acid [I: $R_1$ is H; $R_2$ is $(CH_3)_3C$; $R_3$ is 4-$ClC_6H_4CO$; $R_4$ is H; Y is $CH_2CH_2$] is prepared by reaction of ethyl β-bromopropionate with 3 - (4 - chlorobenzoyl)-2-t-butylindole in dry dimethylformamide in the presence of sodium hydride, and saponification of the resulting ethyl β-[3-(4-chlorobenzoyl)-2-t-butyl-1-indole]propionate all according to the procedure described above in Example 1(B) and (C).

EXAMPLE 46

α - [3 - (4-chlorobenzoyl)-2-methyl-5-methoxy-1-indole]acetic acid [I: $R_1$ is H; $R_2$ is $CH_3$; $R_3$ is 4-$ClC_6H_4CO$; $R_4$ is 5-$CH_3O$; Y is $CH_2$] is prepared by reaction of ethyl bromoacetate with 3-(4-chlorobenzoyl)-2-methyl-5-methoxyindole in dry dimethylformamide in the presence of sodium hydride, and saponification of the resulting ethyl α - [3 - (4-chlorobenzoyl)-2-methyl-5-methoxy-1-indole]acetate all according to the procedure described above in Example 1(B) and (C).

EXAMPLE 47

β-[3-(4-nitrobenzoyl)-2-methyl-1-indole]propionic acid [I: $R_1$ is H; $R_2$ is $CH_3$; $R_3$ is 4-$NO_2C_6H_4CO$; $R_4$ is H; Y is $CH_2CH_2$] is prepared by reatcion of ethyl β-bromopropionate with 3-(4-nitrobenzoyl)-2-methylindole in dry dimethylformamide in the presence of sodium hydride, and saponification of the resulting ethyl β-[3-(4-nitrobenzoyl)-2-methyl-1-indole]propionate all according to the procedure described above in Example 1(B) and (C).

EXAMPLE 48

β - [3 - (4-aminobenzoyl)-2-methyl-1-indole]propionic acid [I: $R_1$ is H; $R_2$ is $CH_3$; $R_3$ is 4-$NH_2C_6H_4CO$; $R_4$ is H; Y is $CH_2CH_2$] is prepared by reduction with hydrogen over a palladium-on-channel catalyst of the β-[3-(4-nitrobenzoyl) - 2 - methyl-1-indole]propionic acid described above in Example 47 using the procedure described above in Example 41(A).

EXAMPLE 49

α - [3 - (4-dimethylaminobenzoyl)-2-methyl-1-indole] acetic acid [I: $R_1$ is H; $R_2$ is $CH_3$; $R_3$ is

4-$(CH_3)_2NC_6H_4CO$

Y is $CH_2$] is prepared by heating α-[3-(4-aminobenzoyl)-2-methyl-1-indole]acetic acid with formaldehyde in excess formic acid, and isolation of the product from a neutral medium.

EXAMPLE 50

β - [3 - (4-dimethylaminobenzoyl)-2-methyl-1-indole] propionic acid [I: $R_1$ is H; $R_2$ is $CH_3$; $R_3$ is

4-$(CH_3)_2NC_6H_4CO$ $R_4$ is H; Y is $CH_2CH_2$] is prepared by heating β-[3-(4- aminobenzoyl)-2-methyl - 1 - indole]propionic acid with formaldehyde in excess formic acid, and isolation of the product from a neutral medium.

EXAMPLE 51

(A) 3-(4-t-butylbenzoyl)-2-methylindole [II: $R_2$ is $CH_3$; $R_3$ is 4-$(CH_3)_3CC_6H_4CO$; $R_4$ is H] is prepared by reaction, in dry ether or tetrahydrofuran, of 4-t-butylbenzoyl chloride with the Grignard reagent prepared from 2-methylindole and methyl magnesium bromide using the procedcre described above in Example 1(A).

(B) α - [3 - (4-t-butylbenzoyl)-2-methyl-1-indole]acetic acid [I: $R_1$ is H; $R_2$ is $CH_3$; $R_3$ is 4-$(CH_3)_3CC_6H_4CO$; $R_4$ is H; Y is $CH_2$] is prepared by reaction of ethyl bromoacetate with 3-(4-t-butylbenzoyl)-2-methylindole in dry dimethylformamide in the presence of sodium hydride, and saponification of the resulting ethyl α-[3-(4-t-butylbenzoyl)-2-mtthyl-1-indole]acetate all according to the procedure described above in Example 1(B) and (C).

EXAMPLE 52

β - [3 - (4-t-butylbenzoyl)-2-methyl-1-indole]propionic acid [I: $R_1$ is H; $R_2$ is $CH_3$; $R_3$ is 4-$(CH_3)_3CC_6H_4CO$; $R_4$ is H; Y is $CH_2CH_2$] is prepared by reaction of ethyl β-bromopropionate with 3-(4-t-butylbenzoyl)-2-methylindole in dry dimethylformamide in the presence of sodium hydride, and saponification of the resulting ethyl β-[3-(4-t-butylbenzoyl)-2-methyl-1-indole]-propionate all according to the procedure described above in Example 1(B) and (C).

EXAMPLE 53

(A) 3-benzoyl-2,5-dimethylindole [II: $R_2$ is $CH_3$; $R_3$ is $C_6H_5CO$; $R_4$ is 5-$CH_3$] is prepared by reaction, in dry ether or tetrahydrofuran, of benzoyl chloride with the Grignard reagent prepared from 2,5-dimethylindole and methyl magnesium bromide using the procedure described above in Example 1(A).

(B) α-(3-benzoyl-2,5-dimethyl-1-indole)acetic acid [I: $R_1$ is H; $R_2$ is $CH_3$; $R_3$ is $CH_5Co$; $R_4$ is 5-$CH_3$; Y is $CH_2$] is prepared by reaction of ethyl bromoacetate with 3-benzoyl-2,5-dimethylindole in dry dimethylformamide in the presence of sodium hydride, and saponification of the resulting ethyl α-(3-benzoyl-2,5-dimethyl-1-indole)acetate all according to the procedure described above in Example 1(B) and (C).

EXAMPLE 54

β-(3-benzoyl-2,5-dimethyl-1-indole)propionic acid [I: $R_1$ is H; $R_2$ is $CH_3$; $R_3$ is $C_6H_5CO$; $R_3$ is 5-$CH_3$; Y is $CH_2CH_2$] is prepared by reaction of ethyl β-bromopropionate with 3-benzoyl-2,5-dimethylindole in dry dimethylformamide in the presence of sodium hydride, and saponification of the resulting ethyl β-(3-benzoyl-2,5-dimethyl-1-indole)propionate all according to the procedure described above in Example 1(B) and (C).

EXAMPLE 55

(A) 3-(2-furoyl)-2-methyl-6-hydroxyindole [II: $R_2$ is $CH_3$; $R_3$ is 2-$C_4H_3O-CO$; $R_4$ is 6-HO] is prepared by reaction, in dry ether or tetrahydrofuran, of 2-furancarbonyl chloride with the Grignard reagent prepared from 2-methyl-6-hydroxyindole and methyl magnesium bromide using the procedure described above in Example 1(A).

(B) γ - [3-(2-furoyl)-2-methyl-6-hydroxy-1-indole]butyric acid [I: $R_1$ is H; $R_2$ is $CH_3$; $R_3$ is 2-$C_4H_3O-CO$; $R_4$ is 6-HO; Y is $(CH_2)_3$] is prepared by reaction of ethyl γ-bromobutyrate with 3-(2-furoyl)-2-methyl-6-hydroxyindole in dry dimethylformamide in the presence of sodium hydride, and saponification of the resulting ethyl γ-[3-(2-furoyl)-2-methyl-6-hydroxy-1-indole]butyrate all according to the procedure described above in Example 1(B) and (C).

EXAMPLE 56

(A) 3-(2-pyridinecarbonyl)-2-ethylindole [II: $R_2$ is $C_2H_5$; $R_3$ is 2-$C_5H_4N-CO$; $R_4$ is H] is prepared by reaction, in dry ether or tetrahydrofuran, of 2-pyridinecarbonyl chloride with the Grignard reagent prepared from 2-ethylindole and methyl magnesium bromide using the procedure described above in Example 1(A).

EXAMPLE 57

(A) 3-(3-pyridinecarbonyl)-2-methyl-6-trifluoromethylindole [II: $R_2$ is $CH_3$; $R_3$ is 3-$C_5H_4N-CO$; $R_4$ is 6-$CF_3$] is prepared by reaction, in dry ether or tetrahydrofuran, of 3-pyridinecarbonyl chloride with Grignard reagent prepared from 2-methyl-6-trifluoromethylindole and methyl magnesium iodide using the procedure described above in Example 1(A).

(B) α - [3-(3-pyridinecarbonyl)-2-methyl-6-trifluoromethyl-1-indole]acetic acid [I: $R_1$ is H; $R_2$ is $CH_3$; $R_3$ is 3-$C_5H_4N-CO$; $R_4$ is 6-$CF_3$; Y is $CH_2$] is prepared by reaction of ethyl bromoacetate with 3-(3-pyridinecarbonyl)-2-methyl-6-trifluoromethylindole in dry dimethylformamide in the presence of sodium hydride, and saponification of the resulting ethyl α-[3-(3-pyridinecarbonyl)-2-methyl-6-trifluoromethyl-1-indole]acetate all according to the procedure described above in Example 1(B) and (C).

EXAMPLE 58

(A) 3-(4-pyridinecarbonyl)-2-methyl-5,6-methylenedioxyindole [II: $R_2$ is $CH_3$; $R_3$ is 4-$C_5H_4N-CO$; $R_4$ is 5,6-$OCH_2O$] is prepared by reaction, in dry ether or tetrahydrofuran, of 4-pyridinecarbonyl chloride with the Grignard reagent prepared from 2-methyl-5,6-methylenedioxyindole and methyl magnesium bromide using the procedure described above in Example 1(A).

(B) α-[3-(4-pyridinecarbonyl)-2-methyl-5,6-methylenedioxy-1-indole]acetic acid [I: $R_1$ is H; $R_2$ is $CH_3$; $R_3$ is 4-$C_5H_4N-CO$; $R_4$ is 5,6-$OCH_2O$; Y is $CH_2$] is prepared by reaction of ethyl bromoacetate with 3-(4-pyridinecarbonyl)-2-methyl-5,6-methylenedioxyindole in dry dimethylformamide in the presence of sodium hydride, and saponification of the resulting ethyl α[3-(4-pyridinecarbonyl)-2-methyl-5,6-methylenedioxy-1-indole]acetate all according to the procedure described above in Example 1(B) and (C).

EXAMPLE 59

(A) 3 - (4-isoxazolecarbonyl)-2-methyl-5,6-ethylenedioxyindole [II: $R_2$ is $CH_3$; $R_3$ is 4-$C_5H_4N-CO$; $R_4$ is 5,6-$OCH_2CH_2O$] is prepared by reaction, in dry ether or tetrahydrofuran, of 4-isoxazolecarbonyl chloride with the Grignard reagent prepared from 2-methyl-5,6-ethylenedioxyindole and methyl magnesium bromide using the procedure described above in Example 1(A).

(B) α-[3-(4-isoxazolecarbonyl)-2-methyl-5,6-ethylenedioxy-1-indole]acetate [I: $R_1$ is H; $R_2$ is $CH_3$; $R_3$ is 4-$C_3H_2NO-CO$; $R_4$ is 5,6-$OCH_2CH_2O$; Y is $CH_2$] is prepared by reaction of ethyl bromoacetate with 3-(4-isoxazolecarbonyl)-2-methyl-5,6-ethylenedioxyindole in dry dimethylformamide in the presence of sodium hydride, and saponification of the resulting ethyl α-[3-(4-isoxazolecarbonyl)-2-methyl-5,6-ethylenedioxy-1- indole]acetate all according to the procedure described above in Example 1(B) and (C).

EXAMPLE 60

(A) 3-(4-thiazolecarbonyl)-2-methylindole [II: $R_2$ is $CH_3$; $R_3$ is 4-$C_3H_2NS-CO$; $R_4$ is H] is prepared by reaction, in dry ether or tetrahydrofuran, of 4-thiazolecarbonyl chloride with the Grignard reagent prepared from 2-methylindole and methyl magnesium bromide using the procedure described above in Example 1(A).

(B) α-[3-(4-thiazolecarbonyl)-2-methyl-1-indole]acetic acid [I: $R_1$ is H; $R_2$ is $CH_3$; $R_3$ is 4-$C_3H_2NS-CO$; $R_4$ is H; Y is $CH_2$] is prepared by reaction of ethyl bromoacetate with 3-(4-thiazolecarbonyl)-2-methylindole in dry dimethylformamide in the presence of sodium hydride, and saponification of the resulting ethyl α-[3-(4-thiazolecarbonyl)-2-methyl-1-indole]acetate al 1 according to the procedure described above in Example 1(B) and (C).

EXAMPLE 61

(A) 3-(5-thiazolecarbonyl)-2-methylindole [II: $R_2$ is $CH_3$; $R_3$ is 5-$C_3H_2NS$-CO; $R_4$ is H] is prepared by reaction, in dry ether or tetrahydrofuran, of 5-thiazolecarbonyl chloride with the Grignard reagent prepared from 2-methylindole and methyl magnesium bromide using the procedure described above in Example 1(A).

(B) α-[3-(5-thiazolecarbonyl)-2-methyl - 1 - indole]acetic acid [I: $R_1$ is H; $R_2$ is $CH_3$; $R_3$ is 5-$C_3H_2NS$-CO; $R_4$ is H; Y is $CH_2$] is prepared by recation of ethyl bromoacetate with 3-(5-thiazolecarbonyl)-2-methylindole in dry dimethylformamide in the presence of sodium hydride, and saponification of the resulting ethyl α-[3-(5-thiazolecarbonyl)-2-methyl-1-indole]acetate all according to the procedure described above in Example 1(B) and (C).

EXAMPLE 62

(A) 3-(4-isothiazolecarbonyl)-2-methylindole [II: $R_2$ is $CH_3$; $R_3$ is 4-$C_3H_2NS$-CO; $R_4$ is H] is prepared by reaction, in dry ether or tetrahydrofuran, of 4-isothiazolecarbonyl chloride with the Grignard reagent prepared from 2-methylindole and methyl magnesium bromide using the procedure described above in Example 1(A).

(B) α-[3-(4-isothiazolecarbonyl)-2-methyl - 1 - indole]acetic acid [I: $R_1$ is H; $R_2$ is $CH_3$; $R_3$ is 4-$C_3H_2NS$-CO; $R_4$ is H; Y is $CH_2$] is prepared by reaction of ethyl bromoacetate with 3-(4-isothiazolecarbonyl)-2 - methylindole in dry dimethylformamide in the presence of sodium hydride, and saponification of the resulting ethyl α-[3-(4-isothiazolecarbonyl)-2-methyl-1 - indole]acetate all according to the procedure described above in Example 1(B) and (C).

EXAMPLE 63

3-(5-isothiazolecarbonyl)-2-methylindole [II: $R_2$ is $CH_3$; $R_3$ is 5-$C_3H_2NS$-CO; $R_4$ is H] is prepared by reaction, in dry ether or tetrahydrofuran, of 5-isothiazolecarbonyl chloride with the Grignard reagent prepared from 2-methylindole and methyl magnesium bromide using the procedure described above in Example 1(A).

EXAMPLE 64

(A) 3-(α-phenylacetyl)-2-methylindole [II: $R_2$ is $CH_3$; $R_3$ is $C_6H_5CH_2CO$; $R_4$ is H] is prepared by reaction, in dry ether or tetrahydrofuran, of phenylacetyl chloride with the Grignard reagent prepared from 2-methylindole and methyl magnesium bromide using the procedure described above in Example 1(A).

(B) α-[3-(α-phenylacetyl)-2-methyl - 1 - indole]acetic acid [I: $R_1$ is H; $R_2$ is $CH_3$; $R_3$ is $C_6H_5CH_2CO$; $R_4$ is H; Y is $CH_2$] is prepared by reaction of ethyl bromoacetate with 3-(α-phenylacetyl)-2-methylindole in dry dimethylformamide in the presence of sodium hydride, and saponification of the resulting ethyl α-[3-(α-phenylacetyl)-2-methyl-1-indole]acetate all according to the procedure described above in Example 1(B) and (C).

EXAMPLE 65

(A) 2-methyl-3-phenylindole [II: $R_2$ is $CH_3$; $R_3$ is $C_6H_5$; $R_4$ is H].—A mixture of 21.6 g. (0.2 mole) of phenylhydrazine, 26.8 g. (0.2 mole) of phenylacetone, and 50 ml. of a solution of concentrated aqueous hydrochloric acid in 100 ml. of absolute ethanol, the whole dissolved in 300 ml. of absolute ethanol, was refluxed on a steam bath for two hours, the mixture concentrated to a small volume in vacuo, and the resulting green sludge taken up in water/ether. The organic phase was washed twice with water, and the resulting orange solution was dried and charcoaled. The pale yellow filtrate was taken to dryness in vacuo, and the residual yellow viscous gum distilled in vacuo at 0.5 mm., the product being collected at 143–152° C. There was thus obtained 34 g. of 2-methyl-3-phenylindole as a yellow viscous oil.

(B) Ethyl α-(2-methyl-3-phenyl-1-indole)acetate [I: $R_1$ is $C_2H_5$; $R_2$ is $CH_3$; $R_3$ is $C_6H_5$; $R_4$ is H; Y is $CH_2$] was prepared by reacting 33.6 g. (0.20 mole) of ethyl bromoacetate with 37 g. (0.18 mole) of 2-methyl-3-phenylindole in the presence of 7.8g. (0.20 mole) of a 62% suspension of sodium hydride in mineral oil in 250 ml. of dimethylformamide using the procedure described above in Example 1(B). There was thus obtained 47 g. of ethyl α-(2-methyl-3-phenyl-1-indole)-acetate as a pale yellow oil.

(C) α-(2-methyl-3-phenyl-1-indole)acetic acid [I: $R_1$ is H; $R_2$ is $CH_3$; $R_3$ is $C_6H_5$; $R_4$ is H; Y is $CH_2$] was prepared by saponifying 47 g. (0.16 mole) of ethyl α-(2-methyl-3-phenyl-1-indole)acetate in a solution containing 400 ml. of ethanol and 100 ml. of 35% aqueous sodium hydroxide using the procedure described above in Example 1(C). The crude product was recrystallized from benzene giving 26 g. of α-(2-methyl-3-phenyl-1-indole)acetic acid, M.P. 159—67° C. (dec.).

*Analysis.*—Calcd. for $C_{17}H_{15}NO_2$ (percent): C, 76.96; H, 5.70; N, 5.28. Found (percent): C, 77.08; H, 5.67; N, 4.91.

In psychomotor activity studies in mice, α-(2-methyl-3-phenyl-1-indole)acetic acid was found to depress 74% of the motor activity of the test animals at a dose of 300 mg./kg. (p.o.). Psychomotor depressant activity was determined in standard activity cages using the method of Dews, Brit. J. Pharmacol., 8, 46 (1953) in which mice, medicated with the test compound, are placed in wire mesh cages equipped with a photoelectric cell so adjusted that a mouse breaking the beam activates a magnetic digital counter. Thus the number of times the light beam is broken over a period of time is an indication of the motor activity of the animals, and a reduction in the number of counts in the medicated mice over control groups, run simultaneously, is taken as evidence of psychomotor depressant activity. The dose at which such reduction in motor activity was observed was recorded as the active dose.

EXAMPLE 66

(A) 3-(4 - chlorophenyl) - 2 - methylindole [II: $R_2$ is $CH_3$; $R_3$ is 4 - $ClC_6H_4$; $R_4$ is H] was prepared by reacting 54 g. (0.5 mole) of phenylhydrazine with 84 g. (0.5 mole) of α - (4 - chlorophenyl)-acetone in 750 ml. of absolute ethanol and in the presence of 125 ml. of concentrated hydrochloric acid dissolved in 250 ml. of absolute ethanol using the procedure described above in Example 65(A). The crude product was recrystallized from cyclohexane giving 97 g. of 3 - (4-chlorophenyl)-2-methylindole, M.P. 110–111.5° C.

(B) Ethyl α - [3 - (4-chlorophenyl)-2-methyl-1-indole] acetate [I: $R_1$ is $C_2H_5$; $R_2$ is $CH_3$; $R_3$ is 4-$ClC_6H_4$; $R_4$ is H; Y is $CH_2$] was prepared by reacting 25 g. (0.15 mole) of ethyl bromoacetate with 30 g. (0.12 mole) of 3-(4-chlorophenyl) - 2 - methylindole in the presence of 5.8 g. (0.15 mole) of a 62% suspension of sodium hydride in mineral oil in 250 ml. of dimethylformamide using the procedure described above in Example 1(B). There was thus obtained 45 g. of ethyl α-[3-(4-chlorophenyl-2-methyl-1-indole]acetate as a brown oil.

(C) α - [3 - (4 - chlorophenyl)-2-methyl-1-indole]acetic acid [I: $R_1$ is H; $R_2$ is $CH_3$; $R_3$ is 4-$ClC_6H_4$; $R_4$ is H; Y is $CH_2$] was prepared by saponification of 46 g. (0.14 mole) of ethyl α-[3-(4-chlorophenyl)-2-methyl-1-indole] acetate in a solution of 400 ml. of ethanol and 125 ml. of 35% aqueous sodium hydroxide using the procedure described above in Example 1(C). The crude product was recrystallized twice from ethanol giving 11.0 g. of α-[3-(4-chlorophenyl) - 2 - methyl - 1 - indole]acetic acid, M.P. 188–202° C. (dec.).

*Analysis.*—Calcd. for $C_{17}H_{14}ClNO_2$ (percent): C, 68.11; H, 4.71; N, 4.67; Cl, 11.83. Found (percent): C, 68.24; H, 4.76; N, 4.62; Cl, 11.61.

EXAMPLE 67

(A) Ethyl β - (3 - phenyl - 2 - methyl-1-indole)propionate [I: $R_1$ is $C_2H_5$; $R_2$ is $CH_3$; $R_3$ is $C_6H_5$; $R_4$ is H; Y is $CH_2CH_2$] was prepared by reacting 33 g. (0.20 mole) of ethyl β-bromopropionate with 31.4 g. (0.15 mole) of 3 - phenyl - 2 - methylindole in the presence of 7.1 g. (0.18 mole) of a 62% suspension of sodium hydride in mineral oil in 250 ml. of dimethylformamide using the manipulative procedure described above in Example 1(B). There was thus obtained 46 g. of ethyl β-(3-phenyl - 2 - methyl - 1 - indole)propionate as a yellow oil.

(B) β(3-phenyl - 2 - methyl - 1 - indole)propionic acid [I: $R_1$ is H; $R_2$ is $CH_3$; $R_3$ is $C_6H_5$; $R_4$ is H; Y is $CH_2CH_2$] was prepared by saponification of 46 g. (0.27 mole) of ethyl β - (3 - phenyl - 2 - methyl-1-indole)propionate in a solution of 500 ml. of ethanol and 160 ml. of 10% aqueous sodium hydroxide using the procedure described above in Example 1C. The crude product was recrystallized from ethanol/water giving 21 g. of β-(3 - phenyl-2-methyl-1-indole)propionic acid, M.P. 135–137.5° C.

Analysis.—Calcd. for $C_{18}H_{17}NO_2$ (percent): C, 77.39; H, 6.13; N, 5.01. Found (percent): C, 77.75; H, 6.28; N, 4.87.

β - (3 - phenyl - 2 - methyl-1-indole)propionic acid, when tested as a psychomotor depressant as described above in example 65(C), was found to depress 75% of the motor activity of the test animals at a dose of 300 mg./kg. (p.o).

EXAMPLE 68

(A) Ethyl β - [3 - (4-chlorophenyl)-2-methyl-1-indole] propionate [I: $R_1$ is $C_2H_5$; $R_2$ is $CH_3$; $R_3$ is 4-$ClC_6H_4$; $R_4$ is H; Y is $CH_2CH_2$] was prepared by reacting 20 g. (0.083 mole) of 3 - (4 - chlorophenyl)-2-methylindole with 16.5 g. (0.091 mole) of ethyl β-bromopropionate in 150 ml. of dry dimethylformamide in the presence of 3.62 g. (0.092 mole) of a 61% suspension of sodium hydride in mineral oil using the procedure described above in Example 1(B). There was thus obtained ethyl β - [3-(4-chlorophenyl)-2-methyl-1-indole]propionate.

β-[3-(4-chlorophenyl) - 2 - methyl-1-indole]propionic acid [I: $R_1$ is H; $R_2$ is $CH_3$; $R_3$ is 4-$ClC_6H_4$; $R_4$ is H; Y is $CH_2CH_2$] was prepared by saponification of the ethyl β-[3-(4-chlorophenyl) - 2 - methyl - 1 - indole]propionate obtained above in Example 68(A) in a solution containing 30 g. of potassium hydroxide dissolved in 200 ml. of methanol using the procedure described above in Example 1(C). The crude product was recrystallized from benzene giving 8.4 g. of β-[3-(4-chlorophenyl)-2-methyl-1-indole]propionic acid, M.P. 143.5–145.5° C.

EXAMPLE 69

(A) 3 - (3,4 - methylenedioxyphenyl) - 2 - carbethoxy-6-methylmercaptoindole [II: $R_2$ is $COOC_2H_5$; $R_3$ is

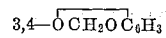
3,4—O CH₂O C₆H₃

$R_4$ is 6-$CH_3S$] is prepared by reaction of ethyl 3,4-methylenedioxyphenylpyruvate with 3 - methylmercaptophenylhydrazine in ethanol in the presence of hydrochloric acid using the procedure described above in Example 65(A).

(B) α - [3 - (3,4-methylenedioxyphenyl)-2-carboxy-6-methylmercapto-1-indole]acetic acid [I: $R_1$ is H; $R_2$ is COOH; $R_3$ is

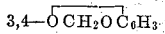
3,4—O CH₂O C₆H₃

$R_4$ is 6 - $CH_3S$; Y is $CH_2$] is prepared by reaction of ethyl bromoacetate with 3 - (3,4 - methylenedioxyphenyl)-2-carbethoxy - 6 - methylmercaptoindole in dry dimethylformamide in the presence of sodium hydride, and saponification of the resulting ethyl α-[3-(3,4-methylenedioxyphenyl) - 2 - carbethoxy-6-methylmercapto-1-indole]acetate [I: $R_1$ is $C_2H_5$; $R_2$ is $COOC_2H_5$; $R_3$ is

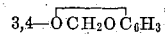
3,4—O CH₂O C₆H₃

$R_4$ is 6 - $CH_3S$; Y is $CH_2$] all according to the procedure described above in Example 1(B) and(C).

EXAMPLE 70

(A) 3 - (3,4 - methylenedioxyphenyl) - 2 - hydroxymethyl - 6 - methylmercaptoindole [II: $R_2$ is $CH_2OH$; $R_3$ is

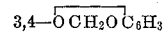
3,4—O CH₂O C₆H₃

$R_4$ is 6-$CH_3S$] is prepared by reduction of 3-(3,4-methylenedioxyphenyl)-2-carbethoxy - 6 - methylmercaptoindole with lithium aluminum hydride in refluxing tetrahydrofuran, and isolation of the product, after decomposition of the resulting complex and unreacted hydride with water.

(B) α - [3 - (3,4-methylenedioxyphenyl)-2-hydroxymethyl - 6 - methylmercapto-1-indole]acetic acid [I: $R_1$ is H; $R_2$ is $CH_2OH$; $R_3$ is

3,4—O CH₂O C₆H₃

$R_4$ is 6-$CH_3S$; Y is $CH_2$] is prepared by reaction of ethyl bromoacetate with 3 - (3,4-methylenedioxyphenyl)-2-hydroxymethyl - 6 - methylmercaptoindole in dry dimethylformamide in the presence of sodium hydride, and saponification of the resulting ethyl α - [3 - (3,4-methylenedioxyphenyl) - 2 - hydroxymethyl-6-methylmercapto-1-indole]acetate all according to the procedure described above in Example 1(B) and (C).

EXAMPLE 71

(A) 3 - benzyl - 2 - methylindole [II: $R_2$ is $CH_3$; $R_3$ is $C_6H_5CH_2$; $R_4$ is H] is prepared by reacting 2-phenylethyl methyl ketone with phenylhydrazine in ethanol in the presence of hydrochloric acid using the procedure described above in Example 65(A).

(B) α - (3 - benzyl-2-methyl-1-indole)acetic acid [I: $R_1$ is H; $R_2$ is $CH_3$; $R_3$ is $C_6H_5CH_2$; $R_4$ is H; Y is $CH_2$] is prepared by reacting ethyl bromoacetate with 3-benzyl-2-methylindole in dry dimethylformamide in the presence of sodium hydride, and saponification of the resulting ethyl α - (3 - benzyl-2-methyl-1-indole)acetate all according to the procedure described above in Example 1(B) and (C).

EXAMPLE 72

(A) 3-(4-chlorobenzyl)-2-methylindole [II: $R_2$ is $CH_3$; $R_3$ is 4-$ClC_6H_4CH_2$; $R_4$ is H.].—In two separate runs, 25 g. (0.093 mole) and 40 g. (0.15 mole) of 3-(4-chlorobenzyl)-2-methylindole, dissolved in 250 ml. and 350 ml. portions, respectively, of tetrahydrofuran was added in each case to a solution containing 0.25 mole of diborane in 250 ml. of tetrahydrofuran. The reaction mixtures were refluxed in each case for one and one-half hours, cooled to room temperature, and the excess dibore destroyed by the addition of a small amount of water. The two solutions were then combined, taken to dryness in vacuo, the residual material taken up in about 1.5 liters of ethyl acetate, the organic solution washed with water, then with brine, dried, and taken to dryness giving 64 g. of 3-(4-chlorobenzyl)-2-methylindole.

(B) Ethyl α-[3-(4 - chlorobenzyl)-2-methyl-1-indole] acetate [I: $R_1$ is $C_2H_5$; $R_2$ is $CH_3$; $R_3$ is 4-$ClC_6H_4CH_2$; $R_4$ is H; Y is $CH_2$] was prepared by reaction of 18.4 g. (0.11 mole) of 3-(4-chlorobenzyl)-2-methylindole in the presence of 5.1 g. (0.11 mole) of a 52% suspension of sodium hydride in mineral oil in 250 ml. of dry dimethylformamide using the procedure described above in Example 1(B). There was thus obtained 30 g. of ethyl α-[3 - (4 - chlorobenzyl)-2-methyl-1-indole-]acetic acid as a red-brown oil.

(C) α-[3-(4-chlorobenzyl)-2 - methyl-1-indole]acetic acid [I: $R_1$ is H; $R_2$ is $CH_3$; $R_3$ is 4-$ClC_6H_4CH_2$; $R_4$ is H; Y is $CH_2$] was prepared by saponification of 30 g. (0.088 mole) of ethyl α-[3-(4-chlorobenzyl)-2-methyl-1- indole]acetate in a solution of 800 ml. of ethanol and 200 ml. of 10% aqueous sodium hydroxide using the procedure described above in Example 1(C). The crude product was recrystallized from benzene giving 7.3 g. of α-[3-(4-chlorobenzyl)-2 - methyl-1-indole]acetic acid, M.P. 202–205° C.

*Analysis.*—Calcd. for $C_{18}H_{16}ClNO_2$ (percent): C, 68.89; H, 5.14; N, 4.46; Cl, 11.30. Found (percent): C, 69.02; H, 5.20; N, 4.42; Cl, 11.49.

EXAMPLE 73

Sodium β - (3-benzoyl-2-methyl-1-indole) propionate [I: $R_1$ is Na $R_2$ is $CH_3$; $R_3$ is $C_6H_5CO$; $R_4$ is H; Y is $CH_2CH_2$].— Seven grams (0.023 mole) of β-(3-benzoyl-2-methyl-1-indole)propionic acid were dissolved in the minimum amount of dimethylformamide, the pH of the solution was adjusted to 10 with 10/ aqueous sodium hydroxide, the mixture was warmed to 50° C. and diluted with 100 ml. of hot water. On cooling, the product separated as a crystalline solid which was collected, washed with water, then with acetone and recrystallized from methanol/acetone to give 3.6 g. of sodium β-(3-benzoyl-2-methyl-1-indole)propionate.

EXAMPLE 74

(A) 2-methyl-3-(3-phenyl-3-oxo - 1 - propenyl)indole [II: $R_2$ is $CH_3$; $R_3$ is $CH=CHCOC_6H_5$; $R_4$ is H] is prepared by reatcion of 2-methyl - 3-indolecarboxaldehyde with ethyl α-benzoylacetate in pyridine, and saponification and decarboxylation of the resulting 2-methyl-3-(3-phenyl-3-oxo-2-carbethoxy-1-propenyl)-indole.

(B) α-[3-(3-phenyl-3-oxo-1-propenyl) - 2 - methyl-1-indole]acetic acid [I: $R_1$ is H; $R_2$ is $CH_3$; $R_3$ is

$R_4$ is H; Y is $CH_2$] is prepared by reacting ethyl bromoacetate with 2-methyl-3-(3-phenyl-3-oxo-1 - propenyl)indole in dry dimethyl-formamide in the presence of sodium hydride, and saponification of the resulting ethyl α-[3-(3-phenyl-3-oxo-1-propenyl)-2-methyl - 1 - indole] acetate all according to the procedure described above in Example 1(B) and (C).

EXAMPLE 75

β-[3-(4-acetylaminobenzoyl)-2-methyl-1 - indole]propionic acid [I; $R_1$ is H; $R_2$ is $CH_3$; $R_3$ is $4-CH_3CONHC_6H_4CO$ $R_4$ is H; Y is $CH_2CH_2$].—A mixture of 6.3 g. (0.018 mole) of ethyl β-[3-(4-aminobenzoyl)-2-methyl-1-indole] propionate and 25 ml. of acetic anhydride was warmed to 60° C. on a steam bath. The mixture, which deposited a copious precipitate, was treated with water, heated to reflux, cooled, and the solid which separated was collected and washed with water to give 11 g. of a cream colored solid. The latter was recrystallibed from ethanl to give 6.0 g. of ethyl β-[3-(4-acetylaminobenzoyl)-2-methyl-1 - indole]propionate, M.P. 188–190° C. The latter was saponified in sodium hydroxide using the procedure described above in Example 1(C), and the crude product recrystallized from acetonitrile to give β-[3-(4-acetylaminobenzoyl)-2-methyl - 1 - indole] propionic acid, M.P. 215–218° C.

EXAMPLE 76

α-(3-benzoyl-2-methyl-4,5,6,7-tetrahydro - 1 - indole) acetic acid [Ia: $R_1$ is H; $R_2$ is $CH_3$; $R_3$ is $C_6H_5CO$; $R_4$ is H; Y is $CH_2$].—Reaction of 2-(2-oxopropyl)cyclohexanone with glycine in glacial acetic acid at room temperature affords α-(2-methyl-4,5,6,7-tetrahydro-1-indole) acetic acid. The latter, on esterification with ethanol in the presence of sufuric acid and reatcion of the product with benzoyl chloride in the presence of stannic chloride or boron trifluoride affords ethyl α-(3-benzoyl-2-methyl-4,5,6,7-tetrahydro - 1 - indole)acetate, which on saponification using the procedure described above in Example 1(C) affords α-(3-benzoyl-2-methyl-4,5,6,7-tetrahydro-1-indole)acetic acid.

EXAMPLE 77

β-(3-benzoyl-2-methyl-4,5,6,7-tetrahydro - 1 - indole) propionic acid [Ia: $R_1$ is H; $R_2$ is $CH_3$; $R_3$ is $C_6H_5CO$; $R_4$ is H; Y is $CH_2CH_2$] is prepared by reaction of 2-(2-oxo-1-propyl)cyclohexanone with α-alanine is glacial citacetic acid; esterification with ethanol in the presence of sulfuric acid and reaction of the resulting ethyl β-(2-methyl-4,5,6,7-tetrahydro-1 - indole)propionate with benzoyl chloride in the presence of stannic chloride or boron trifluoride; and saponification of the resulting ethyl β-(3-benzoyl-2-methyl-4,5,6,7-tetrahydro-1 - indole)propionate all according to the procedure described above in Example 76.

EXAMPLE 78

α-[3-(4-chlorobenzoyl)-2-methyl-4,5,6,7 - tetrahydro-1-indole]-acetic acid [Ia: $R_1$ is H; $R_2$ is $CH_3$; $R_3$ is

$R_4$ is H; Y is $CH_2$] is prepared by reaction of ethyl bromoacetate with the ethyl α-(2-methyl-4,5,6,7-tetrahydro-1-indole)acetate described above in Example 76 in the presence of stannic chloride or boron trifluoride using the procedure described above in Example 76, and saponification of the resulting ethyl α-[3-(4-chlorobenzoyl)-2-methyl-4,5,6,7-tetrahydro-1-indole]acetate using the procedure described above in Example 1(C).

EXAMPLE 79

Ethyl β-[3-(4-chlorobenzoyl) - 2 - methyl-4,5,6,7-tetrahydro-1-indole]propionic acid [Ia: $R_1$ is H; $R_2$ is $CH_3$; $R_3$ is $4-ClC_6H_4CO$; $R_4$ is H; Y is $CH_2CH_2$] is prepared by reacting 4-chlorobenzoyl chloride with the ethyl β-(2-methyl-4,5,6,7 - tetrahydro - 1 - indole)propionate described above in Example 77 in the presence of stannic chloride or boron trifluoride using the procedure described above in Example 76; and saponification of the resulting ethyl β-[3-(4-chlorobenzoyl)-2-methyl-4,5,6,7 - tetrahydro-1-indole]propionate using the procedure described above in Example 1(C).

EXAMPLE 80

α-[3-(4-methylbenzoyl)-2-methyl - 4,5,6,7 - tetrahydro-1-indole]acetic acid [Ia: $R_1$ is H; $R_2$ is $CH_3$; $R_3$ is $4-CH_3C_6H_4CO$; $R_4$ is H; Y is $CH_2$] is prepared by reaction of 4-methylbenzoyl chloride with the ethyl α-(2-methyl-4,5,6,7-tetrahydro-1-indole)acetate described above in Example 76 in the presence of stannic chloride or boron trifluoride using the procedure described above in Example 76; and saponification of the resulting ethyl α-[3-(4-methylbenzoyl)-2-methyl - 4,5,6,7 - tetrahydro-1-indole]propionate using the procedure described above in Example 1(C).

EXAMPLE 81

Ethyl β-[3-(4-methylbenzoyl) - 2 - methyl - 4,5,6,7-tetrahydro-1-indole]propionic acid [Ia: $R_1$ is H; $R_2$ is $CH_3$; $R_3$ is $4-CH_3C_6H_4CO$; $R_4$ is H; Y is $CH_2CH_2$] is prepared by reaction of 4-chlorobenzoyl chloride with the ethyl β-(2-methyl - 4,5,6,7 - tetrahydro-1-indole)propionate described above in Example 77 in the presence of stannic chloride or boron trifluoride using the procedure described above in Example 76; and saponification of the resulting ethyl β-[3-(4-methylbenzoyl) - 2 - methyl - 4,5, 6,7-tetrahydro-1-indole]propionate using the procedure described above in Example 1(C).

EXAMPLE 82

γ-(3-benzoyl-2-methyl - 1 - indole)butyric acid [I: $R_1$ is H; $R_2$ is $CH_3$; $R_3$ is $C_6H_5CO$; $R_4$ is H; Y is $(CH_2)_3$] was prepared by reaction of 9.6 g. (0.05 mole) of ethyl γ-bromobutyrate with 11 g. (0.05 mole) of 3-benzoyl-2- methylindole in 80 ml. of dimethylformamide in the presence of 2.06 g. (0.05 mole) of a 60% suspension of sodium hydride using the procedure described above in Example 1(B), and saponification of the resulting ethyl γ-(3-benzoyl-2-methyl - 1 - indole)butyrate, obtained as a brown gum, in 100 ml. of methanol containing 15 g. of potassium hydroxide using the procedure described above in Example 1(C). The crude product was recrystallized two times from ethyl acetate to give 6.1 g. of γ-(3-benzoyl-2-methyl-1-indole)butyric acid, melts partly at 132–135° C., melts completely at 151–153° C.

EXAMPLE 83

γ-[3-(2-furoyl)-2-methyl-6-acetoxy - 1 - indole]butyric acid [I: $R_1$ is H; $R_2$ is $CH_3$; $R_3$ is $2-C_4H_3O-CO$; $R_4$ is $6-CH_3COO$; Y is $(CH_2)_3$] is prepared by reaction of γ-[3-(2-furoyl)-2-methyl - 6 - hydroxy - 1 - indole]butyric acid with acetic anhydride in the presence of pyridine.

EXAMPLE 84

α-[3-(3,4-methylenedioxyphenyl)-2-carboxy - 6 - methylsulfinyl-1-indole]acetic acid [I: $R_1$ is H; $R_2$ is COOH; $R_3$ is 
$$3,4-OCH_2OC_6H_3$$
$R_4$ is $6-CH_3SO$; Y is $CH_2$] is prepared by reaction of α-[3-(3,4-methylenedioxyphenyl)-2-carboxy - 6 - methylmercapto-1-indole]acetic acid with 1 mole of hydrogen peroxide in glacial acetic acid at room temperature.

EXAMPLE 85

α-[3-(3,4-methylenedioxyphenyl)-2-carboxy - 6 - methylsulfonyl-1-indole]acetic acid [I: $R_1$ is H; $R_2$ is COOH; $R_3$ is
$$3,4-OCH_2OC_6H_3$$
$R_4$ is $6-CH_3SO_2$; Y is $CH_2$] is prepared by reaction of α-[3-(3,4-methylenedioxyphenyl)-2-carboxy - 6 - methylmercapto-1-indole]acetic acid with 2 moles of hydrogen peroxide in glacial acetic acid at room temperature.

EXAMPLE 86

ω-[3-(4-methoxybenzoyl)-2-methyl - 1 - indole]heptanoic acid [I: $R_1$ is H; $R_2$ is $CH_3$; $R_3$ is $4-CH_3OC_6H_4CO$; $R_4$ is H; Y is $(CH_2)_6$] is prepared by reaction of ethyl ω-bromoheptoate with 3-(4-methoxybenzoyl)-2-methylindole in dry dimethylformamide in the presence of sodium hydride, and saponification of the resulting ethyl ω-[3-(4-methoxybenzoyl)-2-methyl - 1 - indole]heptoate with alcoholic alkali all according to the procedure described above in Example 1(B) and (C).

EXAMPLE 87

(A) 3-(3,4,5 - trimethoxyphenyl)-2-methylindole [II: $R_2$ is $CH_3$; $R_3$ is $3,4,5-(CH_3O)_3C_6H_2$; $R_4$ is H] is prepared by reacting phenylhydrazine with methyl 3,4,5-trimethoxybenzyl ketone in the presence of mineral acid using the procedure described above in Example 65(A).

(B) β-[3-(3,4,5-trimethoxyphenyl) - 2 - methyl-1-indole]propionic acid [I: $R_1$ is H; $R_2$ is $CH_3$; $R_3$ is $3,4,5-(CH_3O)_3C_6H_2$; $R_4$ is H; Y is $CH_2CH_2$] is prepared by reaction of ethyl β-bromopropionate with 3-(3,4,5 - trimethoxyphenyl)-2-methylindole in dry dimethylformamide in the presence of sodium hydride, and saponification in alcoholic alkali of the crude ethyl β-[3-(3,4,5-trimethoxyphenyl) - 2 - methyl-1-indole]propionate thus produced all according to the procedure described above in Example 1(B) and (C).

EXAMPLE 88

β-(3-phenyl - 2 - methyl - 4,5,6,7 - tetrahydro-1-indole) propionic acid [Ia: $R_1$ is H; $R_2$ is $CH_3$; $R_3$ is $C_6H_5$; $R_4$ is H; Y is $CH_2CH_2$] is prepared by refluxing, under a Dean-Stark trap, a benzene solution of cyclohexanone and pyrrolidine; reaction of the resulting cyclohexanonepyrrolidine enamine with α-bromo-α-phenylacetone in refluxing methanol followed by hydrolysis with water; and reaction of the resulting 2-(1-phenyl-2-oxopropyl)cyclohexanone with glycine using the procedure described above in Example 76.

I claim:
1. A compound having the formula:

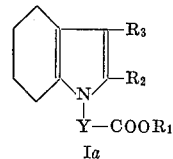

where $R_1$ is hydrogen or lower-alkyl; $R_2$ is hydrogen, lower-alkyl, carboxy, carbo-lower-alkoxy, or hydroxymethyl; $R_3$ is phenyl, benzoyl, or benzoyl substituted by halogen or lower-alkyl; and Y is lower-alkylene.

References Cited

UNITED STATES PATENTS 3,265,698    8/1966    Allen et al. _____ 260—326.13X

OTHER REFERENCES

Noller: Chemistry of Organic Compounds (1965), p. 183.

Sumpter et al.: The Chemistry of Heterocyclic Compounds (Indole & Carbazole Systems) (1954), pp. 44–45.

ALEX MAZEL, Primary Examiner

J. A. NARCAVAGE, Assistant Examiner

U.S. Cl. X.R.

260—240, 295, 302, 307, 326.12, 326.15, 326.16, 569; 424—263, 270, 272, 274

UNITED STATES PATENT OFFICE
CERTIFICATE OF CORRECTION

Patent No. 3,557,142  Dated January 19, 1971

Inventor(s) Malcolm R. Bell  PAGE - 1

It is certified that error appears in the above-identified patent and that said Letters Patent are hereby corrected as shown below:

Column 1, line 68, "alkanyl" should read --alkanoyl--.

Column 2, line 12, "interceptor" should read --acceptor-- line 52, "$R_3$-benzyl" should read --$R_2$-benzyl--.

Column 3, line 68, "of basic" should read --of a basic--.

Column 5, line 8, "later" should read --latter--.

Column 8, line 6, "acetatic" should read --acetic--.

Column 9, line 38, "acetate acid" should read --acetic ac

Column 10, line 51, "α-[3,4-dichlorobenzoyl)..." should r --α-[3-(3,4-dichlorobenzoyl)......--.

Column 11, line 68, "M.P. 226-229.5 c." should read --M.P 226-229.5°C.--.

Column 12, line 48, "anti-vacterial" should read --anti-bacterial--.

Column 13, lines 15-16, "3-benzolindole" should read --3-benzoylindole--; line 53, "0.068" should read --(0.068--.

Column 14, line 61, "189-190°V." should read --189-191°C. line 63, "C, 66.23;" should read --C, 68.23;--.

Column 16, line 2, "hydrxide" should read --hydroxide--.

Column 17, line 10, "B-bromopropionate" should read --β-bromopropionate--.

Column 19, line 67, "C, 17.20;" should read --C, 71.20;--.

FO-1050
(5/69)

UNITED STATES PATENT OFFICE
CERTIFICATE OF CORRECTION

Patent No. 3,557,142  Dated January 19, 1971

Inventor(s) Malcolm R. Bell  PAGE - 2

It is certified that error appears in the above-identified patent and that said Letters Patent are hereby corrected as shown below:

Column 21, line 38, "65.6 g." should read --65.5 g.--; li 46, "...(2,6-dichlorobenzoyl-2-methyl..." should read --...(2, dichlorobenzoyl)-2-methyl...--; line 47, "[$R_1$ is H;..." should read --[I: $R_1$ is H;...--.

Column 23, line 7, "...-2-methyl-1-indol]-" should read --...-2-methyl-1-indole]--; line 32, delete "(A)"; line 49, " dryness" should read --to dryness--.

Column 24, line 56, "palladium-on-channel" should read --palladium-on-charcoal--; line 65, before "Y is $CH_2$", insert --$R_4$ is H;--.

Column 25, line 10, "procedcre" should read --procedure-- line 18, "...-2-mtthyl-1-..." should read --...-2-methyl-1-... line 39, "$R_3$ is $CH_5Co$;" should read --$R_3$ is $C_6H_5CO$;--.

Column 26, line 9, "with Grignard" should read --with the Grignard--; line 44, "$R_3$ is 4-$C_5H_4N$-CO;" should read --$R_3$ is 4 $C_5H_2NO$-CO;--; lines 71-72, "dimethylformanide" should read --dimethylformamide--; line 74, "al 1" should read --all--.

Column 27, line 10, "recation" should read --reaction--.

Column 28, line 62, "phenyl-2-" should read --phenyl)-2--

Column 30, line 45, "methylindole" should read --methyl-indole--; lines 47-48, "(4-chlorobenzyl)" should read --(4-chlorobenzoyl)--; lines 54-55, "dibore" should read --diborane Column 31, line 13, "[I: $R_1$ is Na" should read --[I: $R_1$ Na;--; line 17, "with 10/" should read --with 10%--; line 56, "crystallibed" should read --recrystallized--; line 56, "ethanl should read --ethanol--.

PO-1050
(5/69)

UNITED STATES PATENT OFFICE
CERTIFICATE OF CORRECTION

Patent No. 3,557,142　　　　　　　　Dated January 19, 1971

Inventor(s)　Malcolm R. Bell　　　　　　PAGE - 3

It is certified that error appears in the above-identified patent and that said Letters Patent are hereby corrected as shown below:

Column 32, line 8, "α-alanine" should read --β-alanine--; line 9, "citacetic acid" should read --acetic acid--.

Signed and sealed this 18th day of January 1972.

(SEAL)
Attest:

EDWARD M. FLETCHER, JR.　　　　　ROBERT GOTTSCHALK
Attesting Officer　　　　　　　　Acting Commissioner of Patent